United States Patent
Ihara et al.

(10) Patent No.: US 8,309,272 B2
(45) Date of Patent: Nov. 13, 2012

(54) SOLID OXIDE CELL

(75) Inventors: Manabu Ihara, Tokyo (JP); Shinichi Hasegawa, Tokyo (JP); Keiji Yamahara, Tokyo (JP)

(73) Assignees: Tokyo Institute of Technology, Tokyo (JP); Mitsubishi Chemical Corporation, Tokyo (JP)

( * ) Notice: Subject to any disclaimer, the term of this patent is extended or adjusted under 35 U.S.C. 154(b) by 911 days.

(21) Appl. No.: 12/294,091

(22) PCT Filed: Feb. 27, 2007

(86) PCT No.: PCT/JP2007/053685
§ 371 (c)(1),
(2), (4) Date: Mar. 5, 2009

(87) PCT Pub. No.: WO2007/108282
PCT Pub. Date: Sep. 27, 2007

(65) Prior Publication Data
US 2010/0035099 A1    Feb. 11, 2010

(30) Foreign Application Priority Data

| Mar. 23, 2006 | (JP) | P2006-081679 |
| Aug. 11, 2006 | (JP) | P2006-220265 |
| Dec. 4, 2006 | (JP) | P2006-327130 |
| Jan. 19, 2007 | (JP) | P2007-010359 |

(51) Int. Cl.
*H01M 8/22* (2006.01)
*H01M 8/10* (2006.01)

(52) U.S. Cl. .................. 429/505; 429/521

(58) Field of Classification Search .................. None
See application file for complete search history.

(56) References Cited

U.S. PATENT DOCUMENTS
2002/0015871 A1    2/2002    Tao et al.

FOREIGN PATENT DOCUMENTS

| JP | 9-129256 | 5/1997 |
| JP | 2000-260442 | 9/2000 |
| JP | 2003-272685 | 9/2003 |
| JP | 2003-327411 | 11/2003 |
| JP | 2004-501483 | 1/2004 |

(Continued)

OTHER PUBLICATIONS

English translation of PCT 237 from WIPO, Oct. 21, 2008.*

(Continued)

*Primary Examiner* — Krishnan S Menon
(74) *Attorney, Agent, or Firm* — Oblon, Spivak, McClelland, Maier & Neustadt, L.L.P.

(57) ABSTRACT

A solid oxide cell is provided which, after short-time activation, can generate electricity at a high power density over a prolonged period. This cell can be constituted so as to eliminate the necessity of carrier gas introduction during power generation and, hence, can more easily realize a size reduction in power generation systems. The solid oxide cell at least has an anode having an anode material, a cathode having a cathode material, and an electrolyte disposed between the anode and the cathode and including an ionically conductive solid oxide, wherein the anode material includes a composite metal oxide or a cermet, solid carbon is deposited on the anode material during activation and at least the following reaction schemes (1) and (2) are utilized at the anode during power generation to generate electricity.

$$CO_2 + C \rightarrow 2CO \quad (1)$$

$$CO + O^{2-} \rightarrow CO_2 + 2e^- \quad (2)$$

20 Claims, 12 Drawing Sheets

FOREIGN PATENT DOCUMENTS

| | | |
|---|---|---|
| JP | 2005-71717 | 3/2005 |
| JP | 2005-310701 | 11/2005 |
| JP | 2005-327513 | 11/2005 |
| JP | 2006-73346 | 3/2006 |
| WO | WO 01/80335 A2 | 10/2001 |

OTHER PUBLICATIONS

Shin'ichi Hasegawa, et al., "Netsu Bunkai Tanso o Chokusetsu Nenryo ni mochiita Rechargeable SOFC no Nenryo Kyokumakuatsu to Hatsuden Tokusei no kankei", The Electrochemical Society of Japan Dai 72 kai Taikai koen Yoshishu, Apr. 1, 2005 p. 176.

Shin'ichi Hasegawa, et al., "Netsu Bunkai Tanso o Chokusetsu Nenryo ni mochiita Rechargeable SOFC no kyokyu Gas to Hatsuden Tokusei no kankei", The society of Chemical Engineers, Japan Dai 70 Nenkai (2005) kenkyu Happyo Koen Yoshishu, Feb. 22, 2005, p. 617.

Shin'ichi Hasegawa, et al., "Rechargeable Direct Carbon Nenryo Denchi no Tanso Sekishutsu katei no koritsuka", The Society of Chemical Engineers, Japan Dai 71 Nenkai (2006), kenkyu Happyo Koen Yoshishu, Feb. 28, 2006, p. 549 (with English translation).

Os Hasegawa, et al., "1029 Characteristics of the power generation cycle for rechargeable direct carbon fuel cells", 73th Meeting Presentation Summaries, Apr. 1, 2006, p. 360 (with English translation).

Manabu Ihara, et al., "Quickly Rechargeable Direct Carbon Solid Oxide Fuel Cell with Propane for Recharging", Journal of the Electrochemical Society, vol. 153, No. 8, Jun. 13, 2006, pp. A1544-A1546.

Manabu Ihara, et al., "Operating Conditions of Quickly Rechargeable Direct Carbon Solid Oxide Fuel Cell", $7^{th}$ European Solid Oxide Fuel Cell (SOFC) Forum Session B12, P0417, Jul. 3, 2006, pp. 1-8.

Manabu Ihara, et al., "Operating Conditions of Quickly Rechargeable Direct Carbon Solid Oxide Fuel Cell", Fuel Cells for a Sustainable World and $7^{th}$ European SOFC Forum Session B12, No. P0417, Jul. 3, 2006, p. 26.

Office Action issued Jun. 20, 2012, in Japanese Patent Application No. 2007-072380, filed Mar. 20, 2007 (with English-language Translation).

* cited by examiner

[Fig.1]
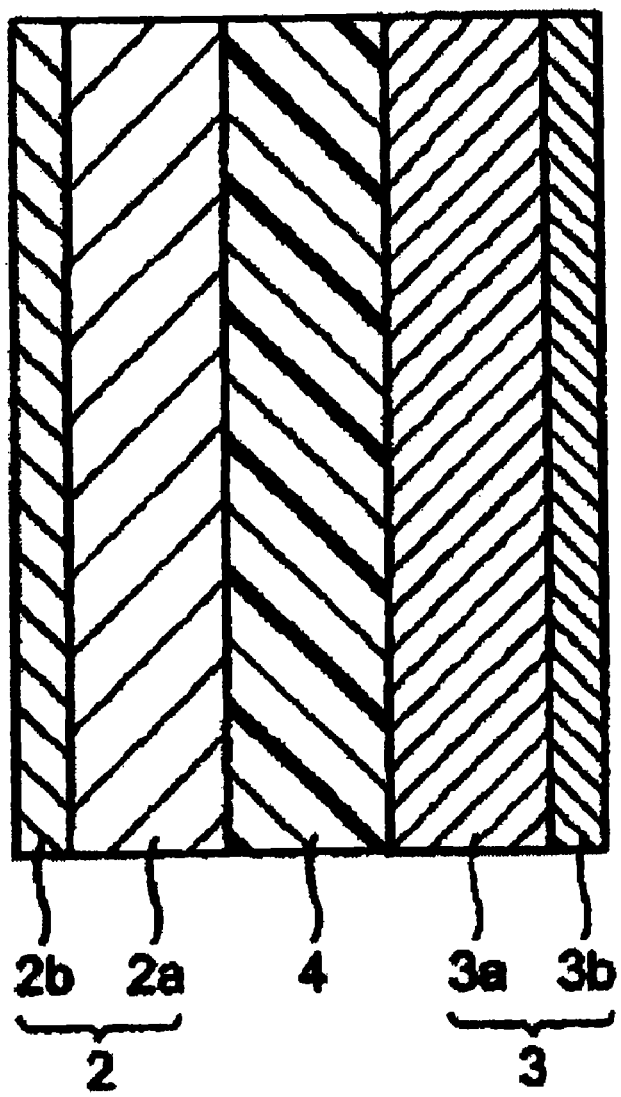

[Fig. 2]
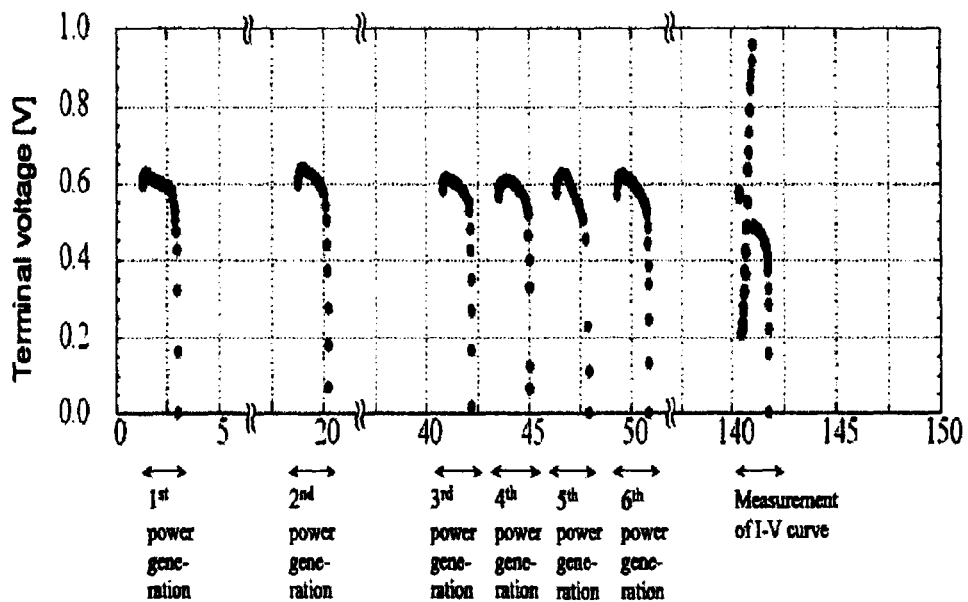
[Fig. 3]
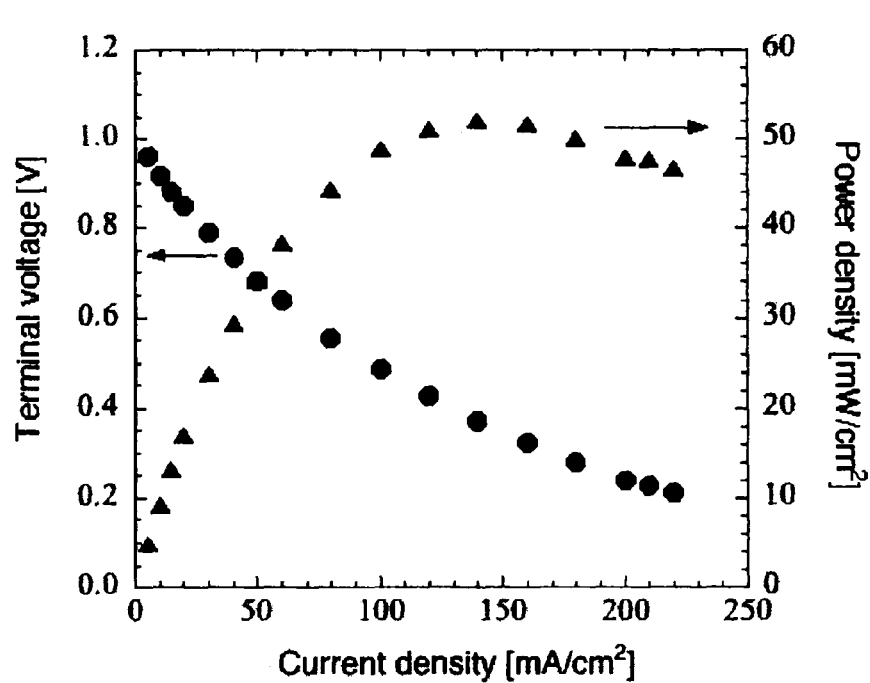

[Fig. 4]
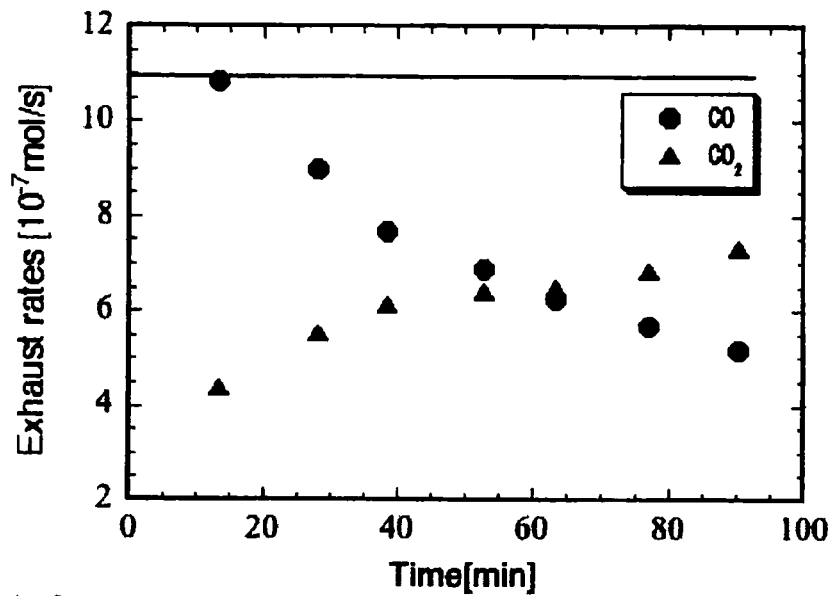
[Fig. 5]
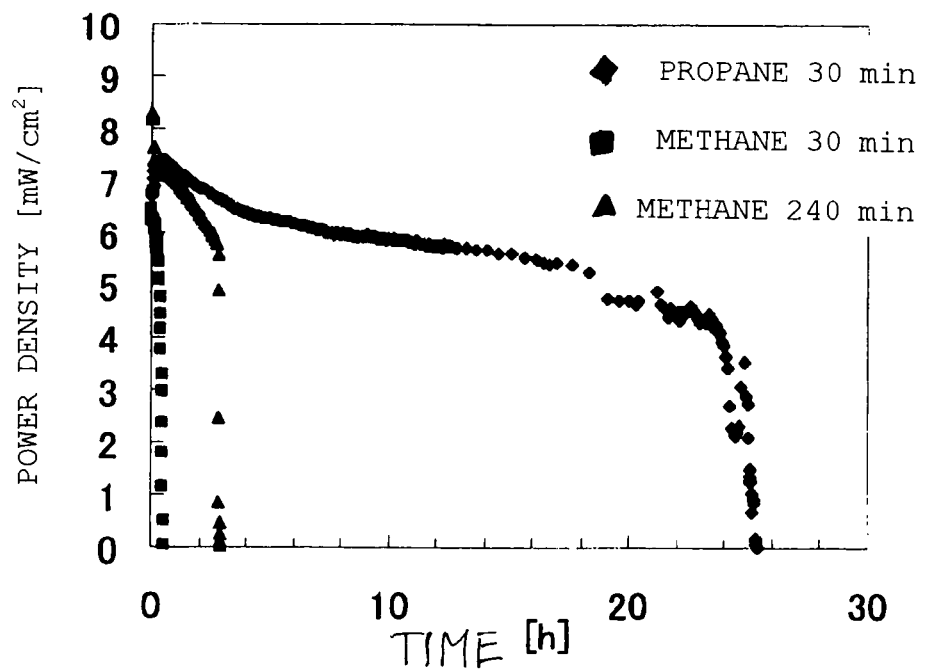

[Fig. 6]
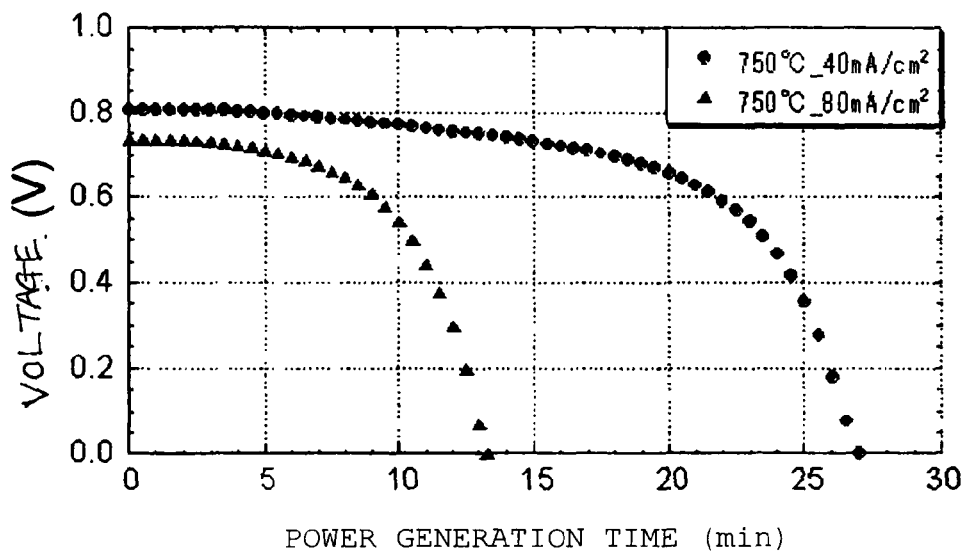
[Fig. 7]
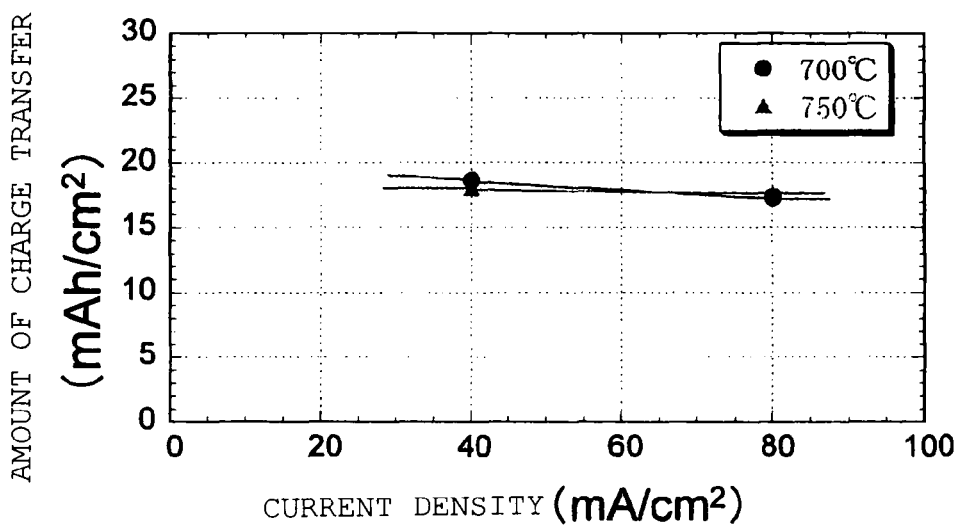

[Fig. 8]
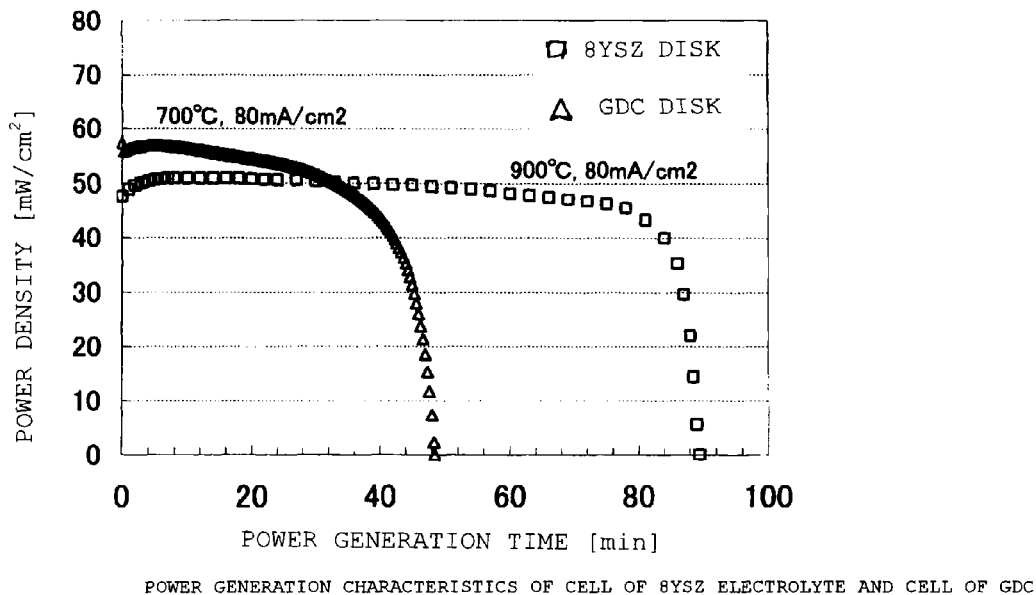
POWER GENERATION CHARACTERISTICS OF CELL OF 8YSZ ELECTROLYTE AND CELL OF GDC ELECTROLYTE
[Fig. 9]
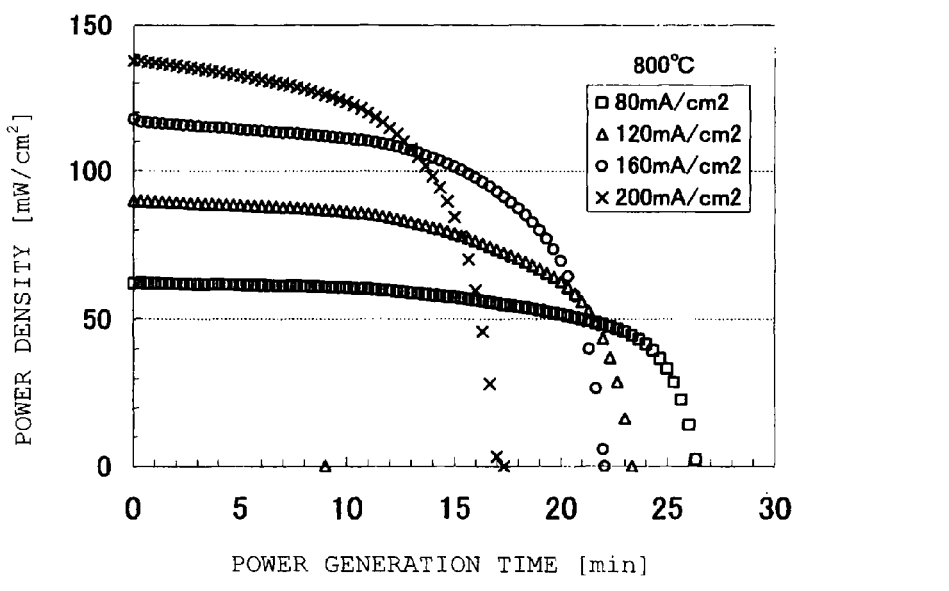
INFLUENCE OF CURRENT DENSITY ON POWER GENERATION CHARACTERISTICS IN CELL OF GDC ELECTROLYTE

[Fig. 10]
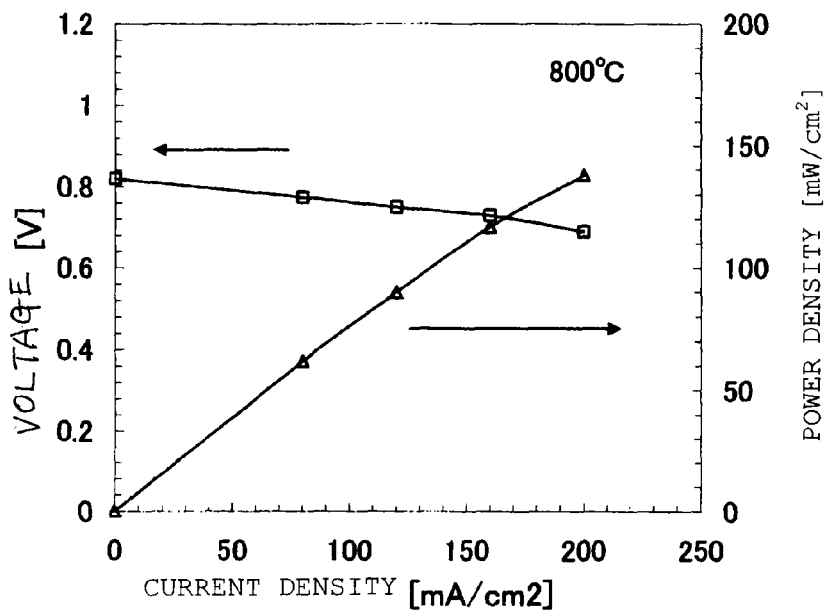
CURRENT DENSITY DEPENDENCE OF VOLTAGE AND POWER DENSITY IN CELL OF GDC ELECTROLYTE
[Fig. 11]
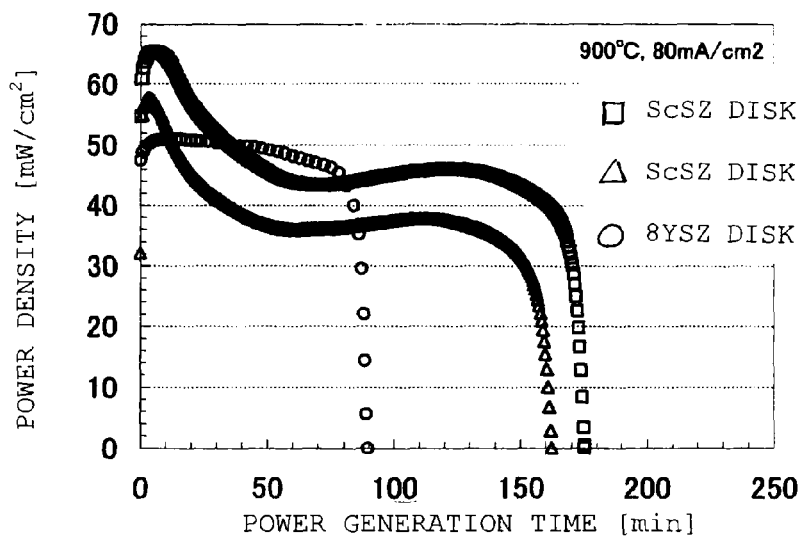
POWER GENERATION CHARACTERISTICS OF CELL OF 8YSZ ELECTROLYTE AND CELLS OF ScSZ ELECTROLYTE

[Fig. 12]
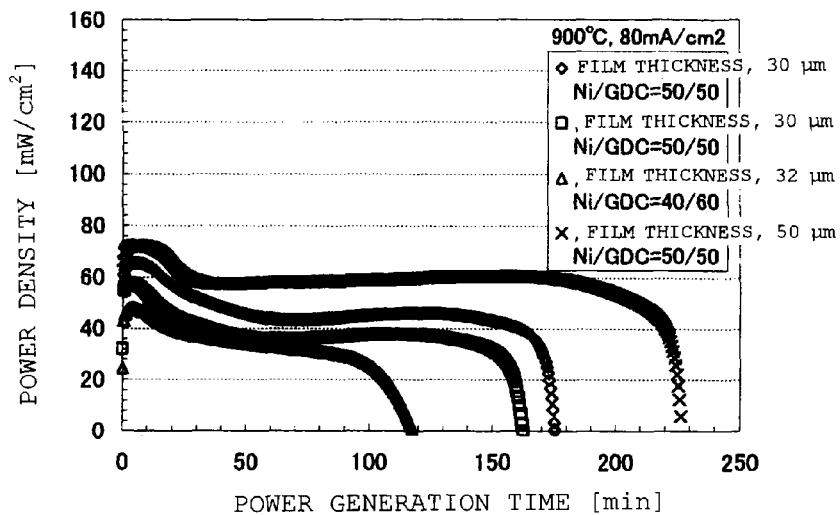
INFLUENCE OF ANODE FILM THICKNESS AND WEIGHT RATIO ON POWER GENERATION CHARACTERISTICS
(CURRENT DENSITY: 80 mA/cm$^2$) IN CELL OF ScSZ ELECTROLYTE
[Fig. 13]
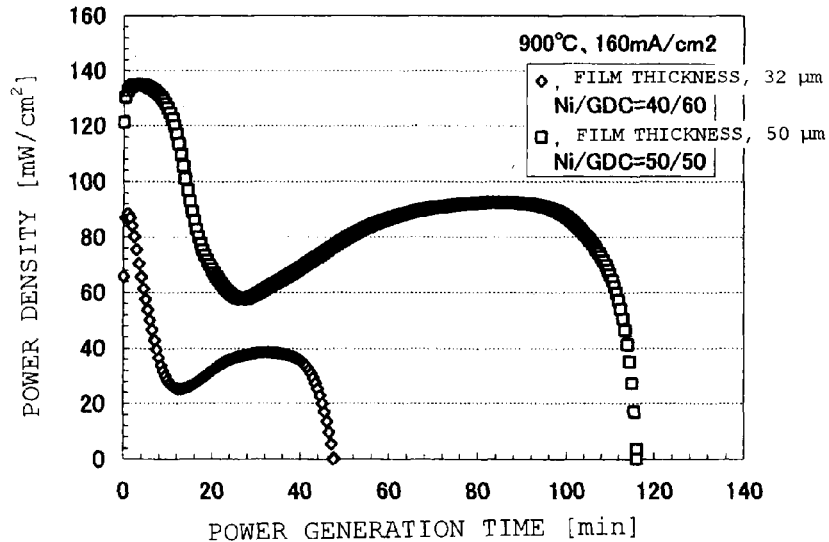
INFLUENCE OF ANODE FILM THICKNESS AND WEIGHT RATIO ON POWER GENERATION CHARACTERISTICS
(CURRENT DENSITY: 160 mA/cm$^2$) IN CELL OF ScSZ ELECTROLYTE

[Fig. 14]
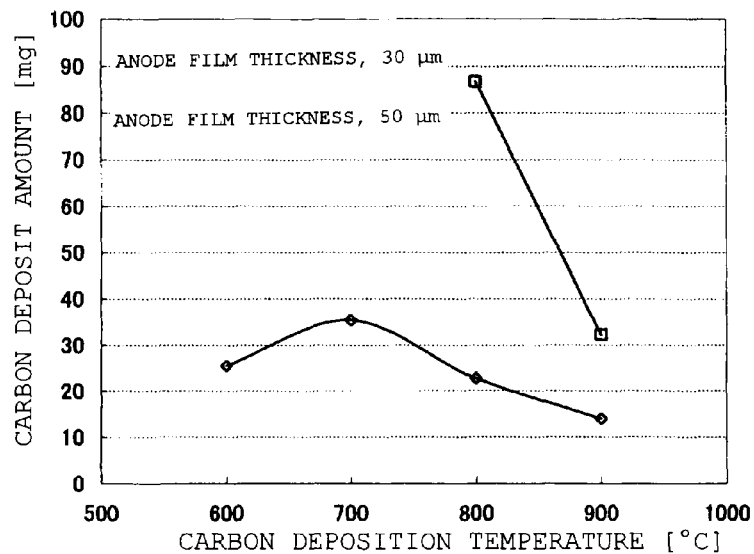
RELATIONSHIPS BETWEEN PYROLYTIC-CARBON DEPOSIT AMOUNT AND DEPOSITION TEMPERATURE
ON ANODE OF CELL OF ScSZ ELECTROLYTE
[Fig. 15]
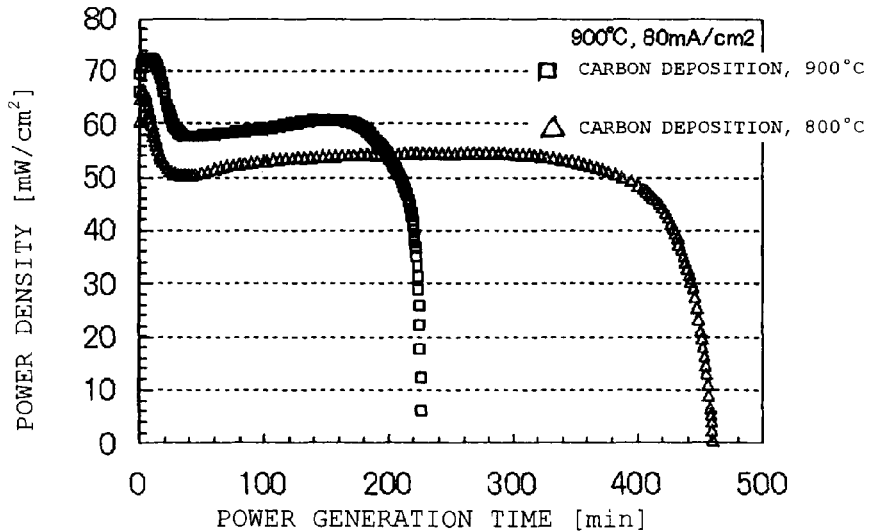
INFLUENCE OF PYROLYTIC-CARBON DEPOSITION TEMPERATURE ON POWER GENERATION
CHARACTERISTICS IN CELL OF ScSZ ELECTROLYTE

[Fig. 16]
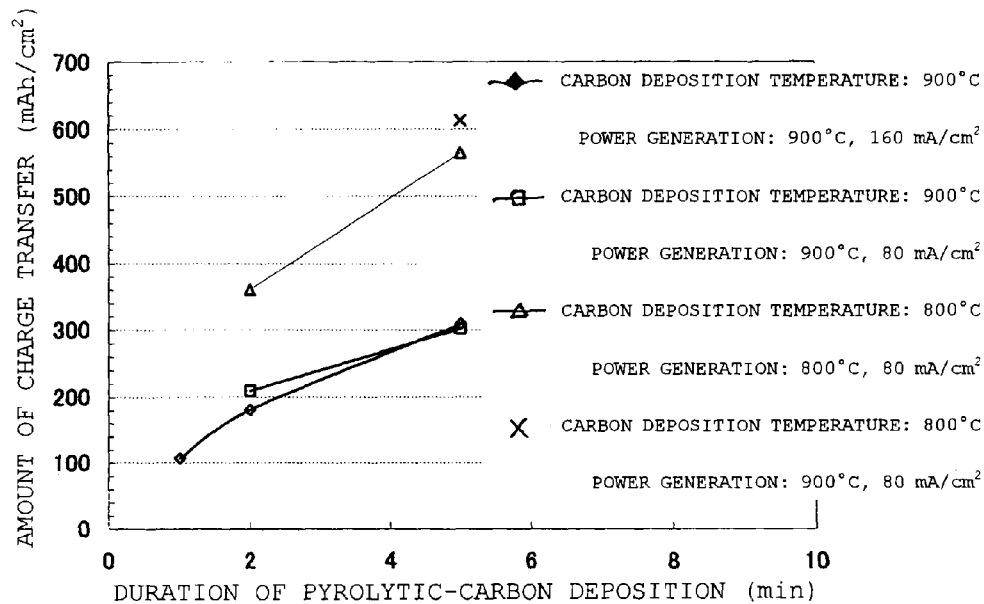
RELATIONSHIPS BETWEEN CHARGE TRANSFER AMOUNT AND PYROLYTIC-CARBON DEPOSITION DURATION IN CELL OF ScSZ ELECTROLYTE
[Fig. 17]
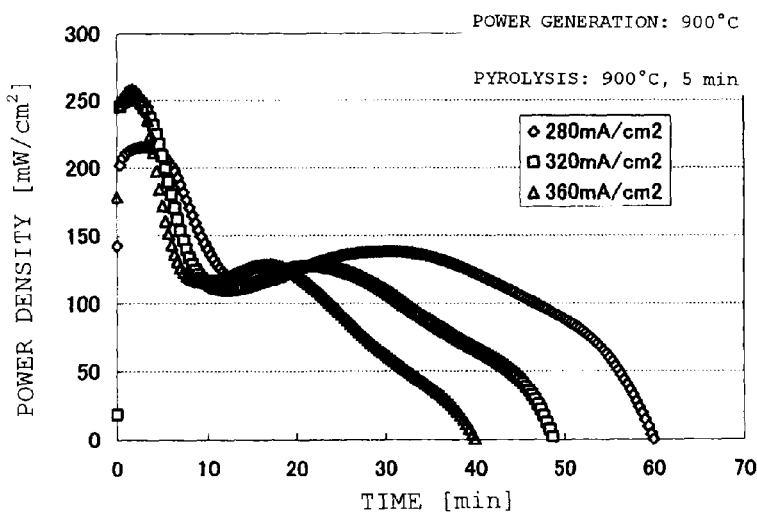
900°C POWER GENERATION CHARACTERISTICS (CURRENT DENSITY: 280, 320, AND 360 mA/cm$^2$) OF ScSZ ELECTROLYTE CELL WHICH HAS UNDERGONE CARBON DEPOSITION BY 5-MINUTE PYROLYSIS OF DRY PROPANE AT 900°C

[Fig. 18]
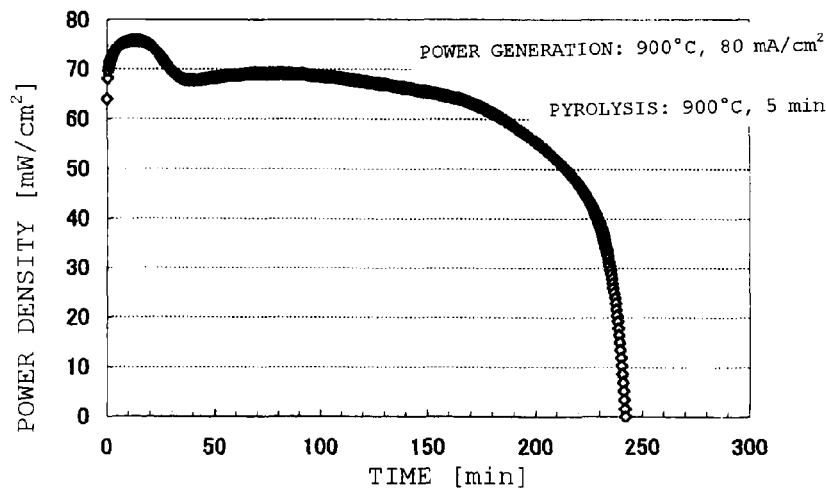
900°C POWER GENERATION CHARACTERISTICS (CURRENT DENSITY: 80 mA/cm$^2$) OF ScSZ ELECTROLYTE CELL WHICH HAS UNDERGONE CARBON DEPOSITION BY 5-MINUTE PYROLYSIS OF DRY PROPANE AT 900°C
[Fig. 19]
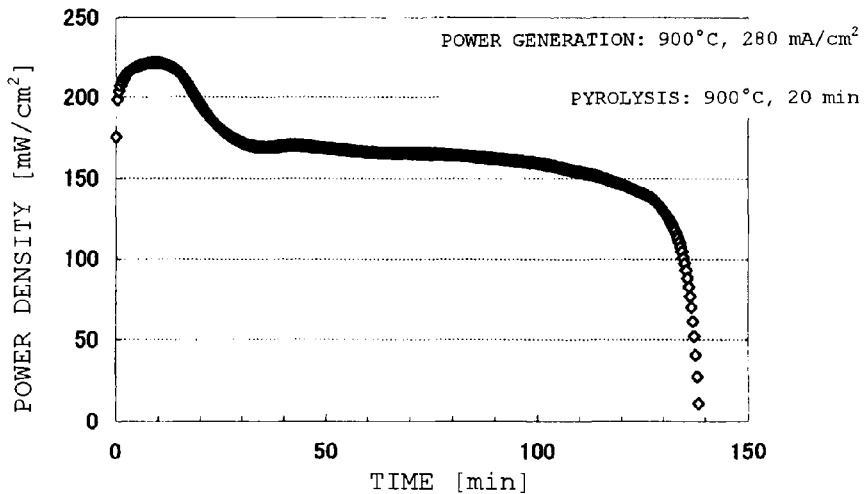
900°C POWER GENERATION CHARACTERISTICS (CURRENT DENSITY: 280 mA/cm$^2$) OF ScSZ ELECTROLYTE CELL WHICH HAS UNDERGONE CARBON DEPOSITION BY 20-MINUTE PYROLYSIS OF DRY PROPANE AT 900°C

[Fig. 20]

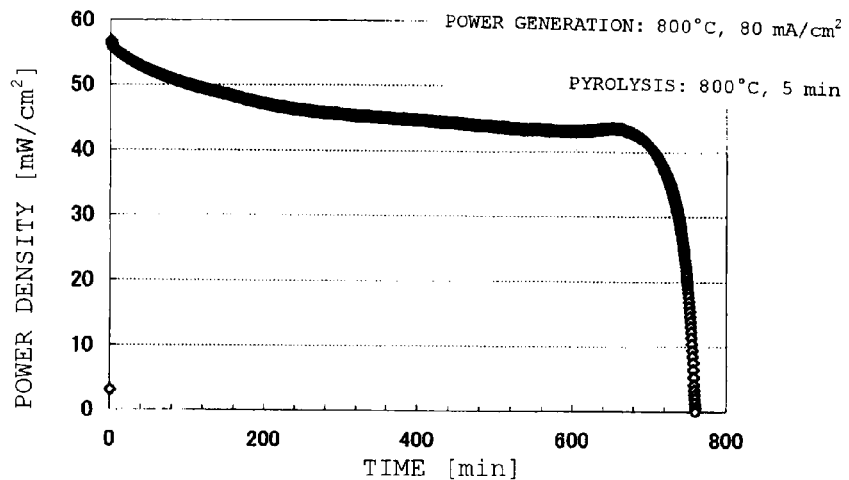

800°C POWER GENERATION CHARACTERISTICS (CURRENT DENSITY: 80 mA/cm²) OF ScSZ ELECTROLYTE CELL WHICH HAS UNDERGONE CARBON DEPOSITION BY 5-MINUTE PYROLYSIS OF DRY PROPANE AT 800°C

[Fig. 21]

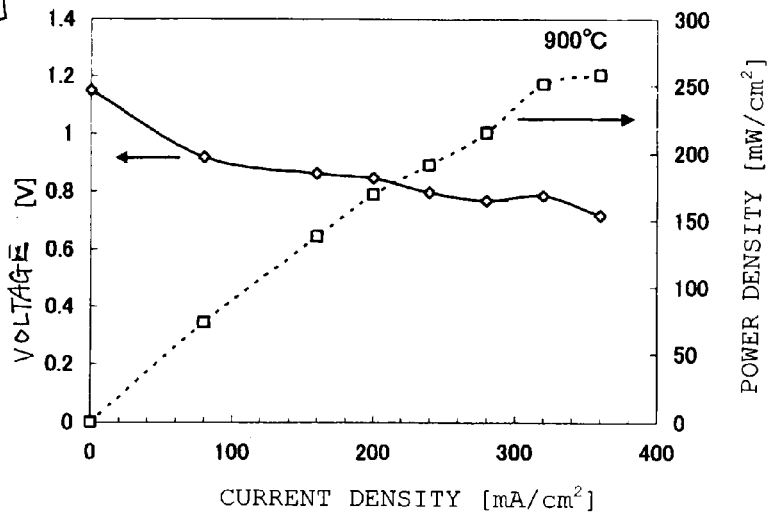

CURRENT DENSITY DEPENDENCE OF MAXIMUM OUTPUT DENSITY AND VOLTAGE IN 900°C CONSTANT-CURRENT POWER GENERATION IN ScSZ ELECTROLYTE CELL WHICH HAS UNDERGONE CARBON DEPOSITION BY 5-MINUTE PYROLYSIS OF DRY PROPANE AT 900°C

[Fig. 22]
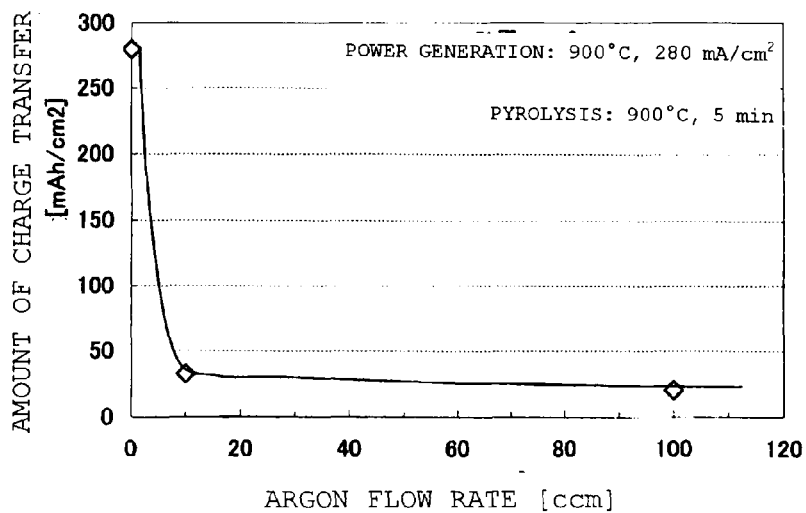
ARGON FLOW RATE DEPENDENCE OF CHARGE TRANSFER AMOUNT IN 900°C POWER GENERATION
(CURRENT DENSITY: 280 mA/cm$^2$) IN ScSZ ELECTROLYTE CELL WHICH HAS UNDERGONE CARBON
DEPOSITION BY 5-MINUTE PYROLYSIS OF DRY PROPANE AT 900°C

SOLID OXIDE CELL

TECHNICAL FIELD

The present invention relates to a solid oxide cell in which solid carbon is deposited on the anode material during activation and this solid carbon is used during power generation to generate electricity.

BACKGROUND ART

A solid oxide cell (SOFC) having a multilayer structure obtained by disposing an electrolyte layer (solid electrolyte layer) made of an ionically conductive solid oxide (oxide ion conductor) between a cathode (air electrode) and an anode (fuel electrode) is hopeful as a third-generation fuel cell. Cells of this type are being developed.

A solid oxide cell is a device in which a gas (fuel gas) containing a reducing agent, e.g., hydrogen ($H_2$) or carbon monoxide (CO), and a hydrocarbon such as methane ($CH_4$) is fed to the anode and a gas (e.g., air) containing an oxidizing agent such as, e.g., oxygen ($O_2$) is fed to the cathode to thereby generate electricity (see, for example, the following patent document 1).

A solid oxide cell (SOFC) and a method of operating a solid oxide cell were proposed which each had a constitution capable of easily attaining a size reduction in power generation systems employing a solid oxide cell without fail (see patent document 2). This cell is a solid oxide cell in which an organic compound containing at least carbon and hydrogen as constituent elements is caused to undergo a pyrolysis reaction within the anode to obtain solid carbon and this solid carbon is utilized as a solid fuel (reducing agent) for power generation.

The solid carbon has the following features. Compared to liquid electrode active materials (reducing agents) or gaseous electrode active materials (reducing agents), the solid carbon has an exceedingly high energy density. It eliminates the necessity of a device constitution for feeding a liquid or gaseous electrode active material to the anode. The anode-side device constitution can hence be simplified.

However, the solid oxide cell described above has had drawbacks that the formation of solid carbon (hereinafter referred to as "activation") necessitates much time, the amount of charge transfer obtained by one activation operation is small, and power generation after activation is low in output densitypower density and short in power generation time. In addition, introduction of a carrier gas for releasing outward a substance yielded on the fuel electrode during power generation has been necessary and this has been an obstacle to size reduction.

Patent Document 1: JP-A-9-129256
Patent Document 2: JP-A-2005-071717

DISCLOSURE OF THE INVENTION

Problems to be Solved by the Invention

The invention has been achieved in view of the background art described above. An object of the invention is to provide a solid oxide cell which, after short-time activation, can generate electricity at a high power density over a prolonged period and which can be constituted so as to eliminate the necessity of carrier gas introduction during power generation and, hence, can more easily realize a size reduction in power generation systems. In particular, it is desired to attain a lower operating temperature, e.g., 750° C. or lower, in order to diminish the deterioration of the cell and peripheral members and facilitate thermal self-sustainment.

Means for Solving the Problems

The present inventors diligently made investigations in order to overcome the problems described above. As a result, it has been found that the efficiency of utilization of the solid carbon deposited on an anode during activation and a power density are improved during power generation when the following reaction scheme (1) proceeds within the anode and the resultant carbon monoxide contributes to power generation according to the following reaction scheme (2). The invention has been thus achieved.

Namely, the invention has the following constitutions.
(1) A method of power generation in a solid oxide cell comprising: an anode having an anode material which has solid carbon deposited thereon and comprises a composite metal oxide or a cermet; a cathode having a cathode material; and an electrolyte disposed between the anode and the cathode and comprising an ionically conductive solid oxide, wherein the method comprises reacting the solid carbon deposited on the anode material with carbon dioxide to convert the reactants to gaseous carbon monoxide and oxidizing the gaseous carbon monoxide to thereby generate electricity.
(2) The method of power generation according to (1) above wherein 50% by mole or more of the carbon monoxide to be consumed during the power generation is the carbon monoxide yielded by the reaction of the solid carbon with carbon dioxide.
(3) The method of power generation according to (1) or (2) above wherein 50% or more of the amount of charge transfer is attributable to the oxidation of the carbon monoxide obtained by the reaction of the solid carbon with carbon dioxide.
(4) The method of power generation according to any one of (1) to (3) above wherein the value of [(Q2−Q1)/Q2]×100 is 50 or larger, in which Q1 is the amount of charge transfer when electricity is generated while introducing argon gas of 25° C. and 1 atm to the anode so as to result in a value of F/S of 3.0 (cm/sec), wherein S is the overall area of the anode ($cm^2$) and F is the flow rate of the argon gas as measured at 25° C. and 1 atm ($cm^3$/sec), and Q2 is the amount of charge transfer when electricity is generated without introducing argon gas to the anode.
(5) The method of power generation according to any one of (1) to (4) above wherein during power generation the reaction-product gases are not released to the outside of the anode in an amount of no less than a pressure increase by the reaction-product gases.
(6) The method of power generation according to any one of (1) to (5) above wherein substantially no carrier gas is introduced to the anode during power generation.
(7) The method of power generation according to any one of (1) to (6) above wherein oxygen is inhibited from being introduced from outside the system to the anode during power generation.
(8) The method of power generation according to any one of (1) to (7) above wherein the solid carbon has been deposited by introducing an organic compound at least comprising carbon and hydrogen as constituent elements to the anode and causing the organic compounds to undergo a pyrolysis reaction under the temperature conditions of 200-1,200° C.

(9) The method of power generation according to (8) above wherein the organic compound at least comprising carbon and hydrogen as constituent elements is one comprising propane or butane as the main component.
(10) The method of power generation according to any one of (1) to (9) above which gives an open-circuit voltage of 0.6 V or higher as examined by introduction of argon gas of 25° C. and 1 atm to the anode after activation and before power generation, the argon gas being introduced so as to result in a value of F/S of 6.1 (cm/sec), wherein S is the overall area of the anode (cm$^2$) and F is the flow rate of the argon gas as measured at 25° C. and 1 atm (cm$^3$/sec).
(11) The method of power generation according to any one of (1) to (9) above which gives an open-circuit voltage of 0.7 V or higher as examined by introduction of argon gas of 25° C. and 1 atm to the anode after activation and before power generation, the argon gas being introduced so as to result in a value of F/S of 0.30 (cm/sec), wherein S is the overall area of the anode (cm$^2$) and F is the flow rate of the argon gas as measured at 25° C. and 1 atm (cm$^3$/sec).
(12) The method of power generation according to any one of (1) to (9) above which gives an open-circuit voltage of 0.9 V or higher as examined by introduction of dry hydrogen gas of 25° C. and 1 atm to the anode after activation and before power generation, the dry hydrogen gas being introduced so as to result in a value of F/S of 6.1 (cm/sec), wherein S is the overall area of the anode (cm$^2$) and F is the flow rate of the dry hydrogen gas as measured at 25° C. and 1 atm (cm$^3$/sec).
(13) The method of power generation according to any one of (1) to (12) above wherein the value of Q/T is 1 (mAh/(cm$^2$·min)) or larger, in which T is the duration of activation (min) and Q is the amount of charge transfer per unit area of the anode (mAh/cm$^2$).
(14) The method of power generation according to any one of (1) to (13) above wherein the value of P/T is 5 (mW/(cm$^2$·min)) or larger, in which T is the duration of activation (min) and P is power density (mW/cm$^2$).
(15) The method of power generation according to any one of (1) to (14) above wherein a temperature during power generation is 750° C. or lower.
(16) The method of power generation according to any one of (1) to (14) above wherein a temperature during power generation is 750° C. or lower and a power density is 50 (mW/cm$^2$) or higher.
(17) The method of power generation according to any one of (1) to (16) above wherein the efficiency of fuel utilization in power generation at a current density of 9.3 mA/cm$^2$ is 60% or higher.
(18) The method of power generation according to any one of (1) to (17) above wherein the efficiency of fuel utilization in power generation at a current density of 80 mA/cm$^2$ is 20% or higher.
(19) The method of power generation according to any one of (1) to (18) above wherein the anode material is a composite metal oxide or a cermet comprising a composite metal oxide and a metal.
(20) The method of power generation according to (19) above wherein the cermet is Ni/YSZ, Ni/GDC, Ni/ScSZ, or Ni/SDC.
(21) The method of power generation according to any one of (1) to (20) above wherein the electrolyte is GDC.
(22) A solid oxide cell comprising an anode having an anode material, a cathode having a cathode material, and an electrolyte disposed between the anode and the cathode and comprising an ionically conductive solid oxide, wherein the anode material comprises a composite metal oxide or a cermet, the anode material has solid carbon deposited thereon and the following reaction schemes (1) and (2) are utilized at the anode during power generation to generate electricity.

$$CO_2 + C \rightarrow 2CO \quad (1)$$

$$CO + O^{2-} \rightarrow CO_2 + 2e^- \quad (2)$$

(23) The solid oxide cell according to (22) above wherein 50% by mole or more of the carbon monoxide (CO) to be consumed according to the reaction scheme (2) is yielded according to reaction scheme (1).
(24) The solid oxide cell according to (22) or (23) above wherein 50% or more of the amount of charge transfer is attributable to the oxidation of the carbon monoxide obtained by the reaction of the solid carbon with carbon dioxide.
(25) The solid oxide cell according to any one of (22) to (24) above wherein the value of $[(Q2-Q1)/Q2] \times 100$ is 50 or larger, in which Q1 is the amount of charge transfer when electricity is generated while introducing argon gas of 25° C. and 1 atm to the anode so as to result in a value of F/S of 3.0 (cm/sec), wherein S is the overall area of the anode (cm$^2$) and F is the flow rate of the argon gas as measured at 25° C. and 1 atm (cm$^3$/sec), and Q2 is the amount of charge transfer when electricity is generated without introducing argon gas to the anode.
(26) The solid oxide cell according to any one of (22) to (25) above wherein during power generation the reaction-product gases are not released to the outside of the anode in an amount of no less than a pressure increase by the reaction-product gases.
(27) The solid oxide cell according to any one of (22) to (26) above wherein substantially no carrier gas is introduced to the anode during power generation.
(28) The solid oxide cell according to any one of (22) to (27) above wherein oxygen is inhibited from being introduced from outside the system to the anode during power generation.
(29) The solid oxide cell according to any one of (22) to (28) above which has an open-circuit voltage of 0.6 V or higher as examined by introduction of argon gas of 25° C. and 1 atm to the anode after activation and before power generation, the argon gas being introduced so as to result in a value of F/S of 6.1 (cm/sec), wherein S is the overall area of the anode (cm$^2$) and F is the flow rate of the argon gas as measured at 25° C. and 1 atm (cm$^3$/sec).
(30) An electrochemical reactor comprising an anode having an anode material, a cathode having a cathode material, and an electrolyte disposed between the anode and the cathode and comprising an ionically conductive solid oxide, wherein the anode material comprises a composite metal oxide or a cermet, the anode material has solid carbon deposited thereon and the following reaction schemes (1) and (2) are utilized for oxidizing the solid carbon.

$$CO_2 + C \rightarrow 2CO \quad (1)$$

$$Co + O^{2-} \rightarrow CO_2 + 2e^- \quad (2)$$

(31) The electrochemical reactor according to (30) above wherein 50% by mole or more of the carbon monoxide (CO) to be consumed according to the reaction scheme (2) is yielded according to reaction scheme (1).
(32) The electrochemical reactor according to (30) or (31) above wherein 50% or more of the amount of charge transfer is attributable to the oxidation of the carbon monoxide obtained by the reaction of the solid carbon with carbon dioxide.
(33) The electrochemical reactor according to any one of (30) to (32) above wherein the value of $[(Q2-Q1)/Q2] \times 100$ is 50 or larger, in which Q1 is the amount of charge transfer when the solid carbon is oxidized while introducing argon gas of 25° C. and 1 atm to the anode so as to result in a value of F/S of 3.0 (cm/sec), wherein S is the overall area of the anode (cm$^2$) and F is the flow rate of the argon gas as measured at 25° C. and 1 atm (cm$^3$/sec), and Q2 is the amount of charge transfer when the solid carbon is oxidized without introducing argon gas to the anode.

(34) The electrochemical reactor according to any one of (30) to (33) above wherein when applying current the reaction-product gases are not released from the anode except for those which cause a pressure increase.

(35) The electrochemical reactor according to any one of (30) to (34) above wherein substantially no carrier gas is introduced into the system when applying current.

(36) The electrochemical reactor according to any one of (30) to (35) above wherein oxygen is inhibited from being introduced from outside the system to the anode when applying current.

Advantages of the Invention

According to the invention, a solid oxide cell can be provided which, even when activated by depositing solid carbon on the anode material in a short time period, can generate electricity at a high power density over a prolonged time period. This cell has a high efficiency of fuel utilization and enables power generation systems to be easily reduced in size.

Namely, in the solid oxide cell of the invention, solid carbon is used as a fuel (reducing agent) for the anode. Solid carbon has an exceedingly high energy density as compared with liquid fuels (reducing agents) or gaseous fuels (reducing agents). It eliminates the necessity of a device constitution for feeding a liquid or gaseous electrode active material to the anode, whereby the anode-side device constitution can be simplified. Consequently, a solid oxide cell having a constitution capable of easily attaining a size reduction in power generation systems without fail can be provided by the invention.

This solid oxide cell may be used, for example, in the following manner. After the solid carbon has been consumed by power generation, the solid oxide cell or the anode is taken out of the power generation system. A pyrolysis reaction is then conducted at a temperature in the range of 200-1,200° C. to yield and deposit solid carbon on the anode material again. Thus, the solid oxide cell can be easily used repeatedly.

The solid oxide cell of the invention may be constituted so that it is fixed in a power generation system and is used without being demounted. In this constitution, after the deposited solid carbon has been consumed, solid carbon is redeposited on the anode material and the cell is then used. In this case, a device constitution for feeding an organic compound to the anode is necessary. However, this device constitution can be simpler than conventional device constitutions for feeding a gas containing a reducing agent. Consequently, in this case also, a size reduction in power generation systems can be easily attained without fail. Furthermore, since the solid oxide cell in this case has been fixed in the power generation system, solid carbon can be redeposited on the anode material more quickly and more easily. Thus, power generation can be repeated.

Secondary cells such as, e.g., lithium ion secondary cells have had a problem that charging requires a relatively long time period. In contrast, in the solid oxide cell of the invention, the charging of the anode with a fuel (solid carbon) can be extremely rapidly conducted because the solid carbon can be rapidly formed by a pyrolysis reaction. Consequently, the solid oxide cell of the invention can be used also as a substitute for a secondary cell, e.g., a lithium ion secondary cell, in a power generation system.

In the solid oxide cell of the invention, hydrogen can be obtained as a reaction product together with solid carbon when the pyrolysis reaction of an organic compound is conducted as described above. Because of this, the solid oxide cell of the invention can be utilized also as a hydrogen generator.

Furthermore, the function of oxidizing solid carbon according to the invention can be used for removing solid carbon compounds (PM: particulate matter) from, e.g., diesel exhaust gas. Namely, the invention is applicable to such exhaust gas cleaning, besides being used as a secondary cell, fuel cell, or hydrogen generator, and can be utilized as an electrochemical reactor (apparatus which provides an electrochemical reaction field).

BRIEF DESCRIPTION OF THE DRAWINGS

FIG. 1 is a diagrammatic sectional view illustrating the basic constitution of a preferred embodiment of the solid oxide cell of the invention.

FIG. 2 is a graphic presentation showing voltage changes in six repeated cycles each including solid carbon deposition by dry-propane introduction and subsequent power generation (Example 1).

FIG. 3 is a graphic presentation showing a relationship between power density and current density obtained after solid carbon deposition while using sweeping values of current density (Example 1).

FIG. 4 is a graphic presentation showing the compositions of gases discharged when $CO_2$ was supplied at 900° C. to an anode on which solid carbon had been deposited (Example 1).

FIG. 5 is a graphic presentation showing changes in power density with time in power generation after solid carbon deposition by the introduction of dry methane and dry propane (Example 1).

FIG. 6 is a graphic presentation showing the power generation characteristics at 750° C. of a solid oxide cell employing a GDC electrolyte (Example 2).

FIG. 7 is a graphic presentation showing relationships between current density and charge transfer amount in a solid oxide cell employing a GDC electrolyte (Example 2).

FIG. 8 is a graphic presentation showing the power generation characteristics of solid oxide cells respectively employing an 8YSZ electrolyte and a GDC electrolyte (Example 3).

FIG. 9 is a graphic presentation showing the influence of current density on the power generation characteristics of a solid oxide cell employing a GDC electrolyte (Example 3).

FIG. 10 is a graphic presentation obtained by plotting each of the terminal voltage and power density immediately after power generation initiation of a solid oxide cell employing a GDC electrolyte against current density (Example 3).

FIG. 11 is a graphic presentation showing the power generation characteristics of solid oxide cells respectively employing an 8YSZ electrolyte and an ScSZ electrolyte.

FIG. 12 is a graphic presentation showing the influence of anode film thickness and weight ratio on power generation characteristics in a solid oxide cell employing an ScSZ electrolyte (current density, 80 mA/cm$^2$) (Example 3).

FIG. 13 is a graphic presentation showing the influence of anode film thickness and weight ratio on power generation characteristics in a solid oxide cell employing an ScSZ electrolyte (current density, 160 mA/cm$^2$) (Example 3).

FIG. 14 is a graphic presentation showing relationships between pyrolytic-carbon deposition temperature and carbon deposit amount in a solid oxide cell employing an ScSZ electrolyte (Example 3).

FIG. 15 is a graphic presentation showing the influence of pyrolytic-carbon deposition temperature on power generation characteristics in a solid oxide cell employing an ScSZ electrolyte (Example 3).

FIG. 16 is a graphic presentation showing relationships between pyrolytic-carbon deposition duration (activation duration) and charge transfer amount in a solid oxide cell employing an ScSZ electrolyte (Example 3).

FIG. 17 shows the power generation characteristics at 900° C. (current densities: 280, 320, and 360 mA/cm$^2$) of an ScSZ electrolyte cell which has undergone carbon deposition by the 5-minute pyrolysis of dry propane at 900° C. (Example 4).

FIG. 18 shows the power generation characteristics at 900° C. (current density: 80 mA/cm$^2$) of an ScSZ electrolyte cell which has undergone carbon deposition by the 5-minute pyrolysis of dry propane at 900° C. (Example 4).

FIG. 19 shows the power generation characteristics at 900° C. (current density: 280 mA/cm$^2$) of an ScSZ electrolyte cell which has undergone carbon deposition by the 20-minute pyrolysis of dry propane at 900° C. (Example 4).

FIG. 20 shows the power generation characteristics at 800° C. (current density: 80 mA/cm$^2$) of an ScSZ electrolyte cell which has undergone carbon deposition by the 5-minute pyrolysis of dry propane at 800° C. (Example 4).

FIG. 21 shows the current density dependence of maximum power density and voltage in 900° C. constant-current power generation in an ScSZ electrolyte cell which has undergone carbon deposition by the 5-minute pyrolysis of dry propane at 900° C. (Example 4).

FIG. 22 shows the argon flow rate dependence of charge transfer amount in 900° C. power generation (current density: 280 mA/cm$^2$) in an ScSZ electrolyte cell which has undergone carbon deposition by the 5-minute pyrolysis of dry propane at 900° C. (Example 4).

DESCRIPTION OF THE REFERENCE NUMERALS AND SIGNS

| | |
|---|---|
| 1 | solid oxide cell |
| 2 | anode |
| 2a | anode material |
| 2b | anode current collector |
| 3 | cathode |
| 3a | cathode material |
| 3b | cathode current collector |
| 4 | electrolyte |

BEST MODE FOR CARRYING OUT THE INVENTION

Preferred embodiments of the invention will be explained below in detail by reference to the drawings. FIG. 1 is a diagrammatic sectional view illustrating the basic constitution of a preferred embodiment of the solid oxide cell of the invention.

The solid oxide cell 1 shown in FIG. 1 is constituted mainly of an anode 2, a cathode 3, and an electrolyte 4 disposed between the anode 2 and the cathode 3.

The anode 2 shown in FIG. 1 has an anode material 2a and an anode current collector 2b. The cathode 3 shown in FIG. 1 has a cathode material 3a and a cathode current collector 3b.

The anode material 2a of the anode 2 is a composite metal oxide or a cermet. The term "cermet" herein means a material obtained by mixing one or more metals with one or more metal oxide powders and sintering the mixture. It is preferred that the composite metal oxide or cermet should be porous. Suitable for use as the composite metal oxide or cermet is one which is in general use as an anode active material in known solid oxide fuel cells. The anode material 2a must have solid carbon deposited on the surface thereof. This "solid carbon" may contain hydrogen, oxygen, sulfur, etc. besides carbon.

The composite metal oxide is not particularly limited so long as it is one which is in general use as an anode active material in solid oxide fuel cells. However, from the standpoint of obtaining sufficient output characteristics during power generation, durability, and other properties without fail, especially preferred examples thereof include: yttria-containing stabilized zirconia ($Y_2O_3$—$ZrO_2$) (hereinafter abbreviated to "YSZ"); $CeO_2$ doped with at least one member selected from the group consisting of Gd, La, Y, Sm, Nd, Ca, Mg, Sr, Ba, Dy, and Yb [in particular, Gd-doped $CeO_2$ (hereinafter abbreviated to "GDC") and Sm-doped $CeO_2$]; $Sc_2O_3$—$ZrO_2$ (hereinafter abbreviated to "ScSZ"); and $Sm_2O_3$—$CeO_2$ (hereinafter abbreviated to "SDC").

In the case of the YSZ, the proportion of $Y_2O_3$ (content of $Y_2O_3$) is preferably 8-10% by mole based on the $Y_2O_3$—$ZrO_2$. In the case of the GDC, the proportion of Gd (content of Gd) is preferably 3-40% by mole, more preferably 8-40% by mole, even more preferably 10-40% by mole, especially preferably 15-40% by mole, based on the doped $CeO_2$. Furthermore, in the case of the Sm-doped $CeO_2$, the proportion of Sm (content of Sm) is preferably 15-40% by mole based on the doped $CeO_2$. Especially preferred examples of ceria-based solid solutions include $Ce_{0.8}Gd_{0.2}O_{2-\delta}$ (wherein δ represents oxygen deficiency) and $Ce_{0.67}Gd_{0.33}O_{2-\delta}$ (wherein δ represents oxygen deficiency).

From the standpoint of obtaining sufficient output characteristics during power generation, the composite metal oxide preferably has a conductivity of 0.01-10 S/cm at 1,000° C.

It is preferred that the anode material 2a be a cermet from the standpoints that an organic compound containing at least carbon and hydrogen as constituent elements is caused to sufficiently undergo a pyrolysis reaction to easily deposit a sufficient amount of solid carbon on the anode material during activation and thereby obtain the effects of the invention with higher certainty and that excellent output characteristics are obtained with higher certainty.

The cermet is not particularly limited so long as it is one which is in general use as an anode active material in solid oxide fuel cells. However, a cermet of at least one metal selected from the group consisting of Ni, Pt, Au, Cu, Fe, W, and Ta with a composite metal oxide (especially the composite metal oxide described above) is preferred. From the standpoints of obtaining sufficient output characteristics during power generation without fail, etc., preferred examples of the cermet include cermets of nickel with a composite metal oxide. Especially preferred examples include cermets of nickel with the composite metal oxide described above.

Most preferred from the standpoint of output characteristics is a cermet of nickel with YSZ (hereinafter abbreviated to "Ni/YSZ"), a cermet of nickel with GDC (hereinafter abbreviated to "Ni/GDC"), a cermet of nickel with ScSZ (hereinafter abbreviated to "Ni/ScSZ"), or a cermet of nickel with SDC (hereinafter abbreviated to "Ni/SDC").

It is preferred from the standpoint of securing electronic conductivity that the volume proportion of the metal V1 and volume proportion of the composite metal oxide V2 in the cermet should satisfy the requirement represented by the following relationship.

$$0.2 \leq [V1/(V1+V2)] \leq 0.8$$

When the value of [V1/(V1+V2)] is smaller than 0.2, there are cases where the anode material 2a cannot have sufficient electronic conductivity and the solid oxide cell 1 hence has insufficient output characteristics. On the other hand, when the value of [V1/(V1+V2)] exceeds 0.8, there are cases where the anode material 2a cannot have sufficient ionic conductivity and the solid oxide cell 1 hence has insufficient output characteristics. From the standpoint of sufficiently imparting both electronic conductivity and ionic conductivity to the anode material 2a, the value of [V1/(V1+V2)] is preferably 0.2-0.8, especially preferably 0.3-0.7, more preferably 0.4-0.6.

Specifically, the Ni/YSZ, Ni/GDC, Ni/ScSZ, or Ni/SDC preferably is one in which the ratio of (volume proportion of Ni)/[volume proportion of (the composite metal oxide+Ni)] is within that range.

The anode film thickness is not particularly limited. However, the thickness is generally from 10 μm to 5 mm, preferably from 20 μm to 1 mm, more preferably from 30 μm to 700 μm, even more preferably from 40 μm to 400 μm, most preferably from 50 μm to 150 μm. By regulating the anode film thickness so as to be large, improvements can be attained in power density P (mW/cm$^2$), value of P/T which will be described later, charge transfer amount per unit anode area Q (mAh/cm$^2$), and value of Q/T which will be described later. Symbol T herein means the duration of activation. Although the film thickness is measured with a stylus type surface roughness meter in the Examples which will be given later, it may be determined through an examination of a section with an SEM.

That thickness of the anode (fuel electrode) which was specified above is an optimal value on the assumption that the anode has the porosity obtained in the Examples which will be given later. Porosity influences the ease of fuel gas feeding to the anode (fuel electrode), ease of the movement of evolved carbon monoxide (CO) gas to effective reaction sites, and amount of spaces available for the deposition of pyrolytic carbon. Because of this, a change in porosity may result in a change in optimal thickness. For example, when an anode has a porosity higher than that of the anodes (fuel electrodes) of the Examples which will be given later, there is a possibility that this anode might have an optimal thickness value shifted to the larger-thickness side. However, the anode film thickness can be suitably determined according to the porosity of the fuel electrode obtained while taking account of that value of anode film thickness shown above.

When the solid oxide cell of the invention is used, it undergoes activation (sometimes referred to as "activation step") and power generation (sometimes referred to as "power generation step"). During activation, solid carbon is deposited on the anode material 2a.

During power generation, this solid carbon is used to generate electrons according to at least the reaction scheme (1) and reaction scheme (2) which will be given later. Simultaneously with the electron generation, electrons are donated to an oxidizing gas at the cathode and oxide ions (O$^{2-}$) generated by ionization are injected into the electrolyte.

Thus, a solid oxide cell 1 having a constitution capable of easily attaining a size reduction in power generation systems without fail can be provided. After the solid carbon has been consumed by power generation, solid carbon can be rapidly redeposited on the anode material in the anode by conducting a pyrolysis reaction, with the solid oxide cell or anode demounted from the power generation system or kept being mounted therein. Namely, the cell can be activated. Thus, the solid oxide cell 1 can be repeatedly used for power generation with ease.

As apparent from the above explanation, the solid oxide cell of the invention eliminates the necessity of a device requiring a large installation space as in conventional solid oxide cells, such as a bomb, reformer, or the like for feeding a reactant gas to the anode. Because of this, a size reduction can be easily attained. Incidentally, the cell can be constituted so as not to necessitate a reformer not only during power generation but also during activation, and this contributes to a size reduction. The size of the solid oxide cell of the invention is not particularly limited. However, the size thereof is preferably from 0.5 cm$^3$ to 2,000 cm$^3$, especially preferably from 1 cm$^3$ to 100 cm$^3$. In case where the size of the solid oxide cell is too large, that feature of the invention which resides in that a size reduction is attained cannot be fully obtained.

The output of the solid oxide cell during power generation is not particularly limited. However, the output thereof is preferably from 0.01 kW to 500 kW, especially preferably from 0.05 kW to 70 kW, more preferably from 30 kW to 100 kW. The solid oxide cell of the invention can produce that output when it has the size shown above.

In the invention, the anode material 2a must have solid carbon deposited on the surface thereof. Examples of methods for depositing solid carbon on the anode material 2a during activation include a method in which an organic compound containing at least carbon and hydrogen as constituent elements is introduced to the anode 2 and this organic compound is caused to undergo a pyrolysis reaction.

The temperature to be used for the pyrolysis reaction is not particularly limited. However, the temperature is preferably in the range of 200-1,200° C. from the standpoint of obtaining a satisfactory rate of the pyrolysis reaction of the organic compound. When the temperature for the pyrolysis reaction of the organic compound during activation is lower than 200° C., there are cases where the pyrolysis reaction of the organic compound (in the case of methane, for example, the reaction is $CH_4 \rightarrow C+2H_2$) does not proceed sufficiently and a sufficient amount of solid carbon cannot be obtained. When the temperature exceeds 1,200° C., there are cases where the anode material 2a deteriorates considerably. From the same standpoints as described above, the temperature for the pyrolysis reaction is especially preferably 300-1,000° C., more preferably 400-800° C. By changing the pyrolytic-carbon deposition temperature, the amount of charge transfer per unit anode area Q (mAh/cm$^2$) and the value of Q/T which will be described later can be improved as will be demonstrated by the Examples given later. Symbol T herein means the duration of activation.

The "organic compound containing at least carbon and hydrogen as constituent elements" to be subjected to pyrolysis reaction may further contain oxygen and/or sulfur as a constituent element. The organic compound may be gaseous or liquid under the conditions of 1 atm and 25° C. From the standpoint of more easily and sufficiently obtaining solid carbon sufficiently functioning as a reducing agent, the organic compound preferably has 1-100, especially preferably 1-10, more preferably 1-6 carbon atoms.

Preferred examples of the organic compound include methane, ethane, propane, butane, methanol, ethanol, propanol, and butanol. Of these, methane, propane, butane, or methanol is especially preferred from the standpoints of handleability, availability, etc. In particular, one containing propane or butane as the main component is more preferred from the standpoints that this organic component brings about a high power density and a large charge transfer amount and that it does not yield a liquid decomposition product. The term "main component" means to contain in an amount of 50% by volume or larger.

The shape and constituent material of the current collector 2b of the anode 2 are not limited so long as the material has electronic conductivity and is chemically and physically stable in an operating temperature range for the solid oxide cell 1. The same current collector as any of those employed in known solid oxide fuel cells can be used. Preferred is one which is chemically and physically stable at 600° C.-1,200° C.

The current collector 2b has, formed therein, feed passages (not shown) for the "organic compound containing at least carbon and hydrogen as constituent elements", which serves as a raw material for solid carbon in conducting a pyrolysis reaction during activation. This current collector 2b functions also as a separator to be disposed between unit cells when two or more solid oxide cells 1 are used as a stacked state.

The anode 2 has a gas feed opening (not shown), a gas discharge opening (not shown), and internal gas passages (not shown) connected to the feed opening and discharge opening. The solid oxide cell of the invention utterly differs from general known fuel cells in the kind of fuel, method of use, power generation principle, etc. However, mechanical outer structures including the gas feed opening, gas discharge opening, and internal gas passages connected to the feed opening and discharge opening may be the same as those in general known fuel cells.

In the solid oxide cell of the invention, it is preferred that substantially no carrier gas for discharging reaction-product gases to the outside should be introduced to the anode during power generation. When substantially no carrier gas is introduced, the reaction represented by reaction scheme (1) occurs more efficiently at the anode as will be described later. This operation is therefore preferred. In addition, this enables the device constitution for power generation to have a far smaller size.

During power generation, a gas containing an oxidizing agent (e.g., air) is fed to the cathode 2 and the cathode material 3a provides a reaction field where the oxidizing agent undergoes a reduction reaction. The composition and shape of the cathode material 3a are not particularly limited, and the same material as any of those generally used in the cathodes employed in known solid oxide fuel cells can be used. For example, materials made of $(LaSr)MnO_3$ or $(LaSr)CoO_3$ composite metal oxides or the like can be advantageously used. Especially preferred examples include $La_{0.85}Sr_{0.15}MnO_3$.

The current collector 3b of the cathode may have the same constitution as the current collector 2b of the anode 2 described above. The constituent material and shape of the current collector 3b are not particularly limited. The same cathode current collector as any of those employed in known solid oxide fuel cells can be used. The current collector 3b has, formed therein, gas passages (not shown) for feeding a gas containing an oxidizing agent, such as air, to the cathode chamber 3a. This current collector 3b functions also as a separator to be disposed between unit cells when two or more solid oxide cells are used in a stacked state.

The electrolyte 4 is an ionically conductive solid oxide. The electrolyte 4 not only is a medium through which oxide ions ($O^{2-}$) move but also functions as a diaphragm for preventing the reducing agent (solid carbon described above) and the gas containing an oxidizing agent (e.g., air) from coming into direct contact with each other. It has a dense structure impermeable to gases. The constituent material of this electrolyte 4 is not particularly limited, and any of the electrolyte materials employed in known solid oxide fuel cells can be used. However, it is preferred that the electrolyte 4 should be constituted of a material which highly conducts oxide ions and has chemical stability and high thermal shock resistance under conditions ranging from the oxidizing atmosphere on the cathode 3 side to the reducing atmosphere on the anode 2 side.

Examples of materials satisfying those requirements include stabilized zirconias such as yttria-stabilized zirconia (YSZ) and scandia-stabilized zirconia (ScSZ); lanthanum gallate; and ceria-based solid solutions.

The stabilized zirconias are not particularly limited. Preferred examples thereof include solid solutions represented by the general formula $$(ZrO_2)_{1-x}(M_2O_3)_x$$

[wherein M represents one or more elements selected from the group consisting of Y, Sc, Sm, Al, Nd, Gd, Yb, and Ce, provided that when M is Ce, then the $M_2O_3$ is replaced by $CeO_2$] or the general formula $$(ZrO_2)_{1-x}(MO)_x$$

[wherein M represents one or more elements selected from the group consisting of Ca and Mg], wherein x satisfies $0 \leq x \leq 0.3$. Especially preferred examples thereof include $(ZrO_2)_{1-x}(Y_2O_3)_x$ (wherein $0 \leq x \leq 0.3$). More preferably, x in the formula satisfies $0.08 \leq x \leq 0.1$. Even more preferred examples thereof include $(ZrO_2)_{0.92}(Y_2O_3)_{0.08}$.

By using yttria-stabilized zirconia (YSZ) as the electrolyte, improvements can be attained in power density P ($mW/cm^2$), value of P/T which will be described later, charge transfer amount per unit anode area Q ($mAh/cm^2$), and value of Q/T which will be described later. Symbol T herein means the duration of activation.

The expression "wherein A represents one or more elements selected from the group consisting of Q, R, and T" as used for describing a formula not only means that the material may be a mixture of a solid solution represented by the formula wherein A is Q with a solid solution wherein A is R, but also means a solid solution which simultaneously has Q and R as A in crystal sites. The same applies hereinafter.

The lanthanum gallate is not particularly limited. However, it preferably is a solid solution represented by the general formula $La_{1-x}Sr_xGa_{1-y-z}Mg_yA_zO_3$ (wherein A represents one or more elements selected from Co, Fe, Ni, and Cu; x is 0.05-0.3; y is 0-0.29; z is 0.01-0.3; and y+z is 0.025-0.3). Examples thereof include $La_{0.8}Sr_{0.2}Ga_{0.8}Mg_{0.15}Co_{0.05}O_{3-\delta}$ (wherein $\delta$ represents oxygen deficiency).

The ceria-based solid solutions are not particularly limited. However, solid solutions represented by $Ce_{1-x}M_xO_2$ (wherein M represents one or more elements selected from the group consisting of Gd, La, Y, Sc, Sm, Al, Pr, Nd, Ca, Mg, Sr, Ba, Dy, Yb, Tb, and other lanthanoids having a valence of 2 or 3) wherein x satisfies $0<x \leq 0.5$ are preferred. More preferred are ones in which M is Gd, i.e., $Ce_{1-x}Gd_xO_2$ (wherein $0<x \leq 0.5$), and ones in which M is Sm, i.e., $Ce_{1-x}Sm_xO_2$ (wherein $0<x \leq 0.5$). In each formula, x especially preferably satisfies $0.03 \leq x \leq 0.4$, more preferably satisfies $0.08 \leq x \leq 0.4$, and most preferably satisfies $0.1 \leq x \leq 0.4$. Especially preferred examples of the ceria-based solid solutions include $Ce_{0.8}Gd_{0.2}O_{2-\delta}$ (wherein $\delta$ represents oxygen deficiency), $Ce_{0.67}Gd_{0.33}O_{2-\delta}$ (wherein $\delta$ represents oxygen deficiency), and $Ce_{0.9}Gd_{0.1}O_{2-\delta}$ (wherein $\delta$ represents oxygen deficiency). In particular, use of GDC as a material for the electrolyte 4 is preferred because a sufficiently high power density can be obtained even when the cell has a temperature of 750° C. or lower during power generation.

From the standpoint of obtaining sufficient output characteristics during power generation, such composite metal oxides preferably have a conductivity of 0.01-10 S/cm at 1,000° C.

Processes for producing the solid oxide cell 1 shown in FIG. 1 are not particularly limited, and known thin-film formation techniques in use for producing known solid oxide fuel cells can be used. Examples thereof include the squeegee method, screen printing, PVD techniques such as vacuum deposition, sputtering, and ion plating, CVD techniques such as thermal CVD, plasma-assisted CVD, and laser CVD, and thermal spraying.

Examples of methods for forming the electrolyte 4 include the sheeting/sintering method which is a known ceramic process. More specifically, a slurry obtained by mixing raw materials and a solvent is spread into a sheet form, dried, and subsequently shaped with a cutter knife or the like according to need, and the resultant sheet is burned. Known additives such as, e.g., a binder, plasticizer, and dispersant may be incorporated into the slurry according to need. Conditions for the forming, burning, etc. can be suitably determined according to the composition of the raw materials. It is also possible to form an electrolyte layer on, e.g., the anode 2 or cathode 3 by any of the thin-film formation techniques including PVD techniques, CVD techniques, and thermal spraying.

For operating the solid oxide cell 1, any method may be used without particular limitations so long as it at least includes an activation step in which solid carbon is deposited on the anode material and a subsequent power generation step in which a gas containing an oxidizing agent is fed to the cathode to generate electricity using the solid carbon as a reducing agent. Usually, an operation including the activation step and the power generation step is repeated in using the cell 1.

Although preferred embodiments of the invention were explained above, the invention should not be construed as being limited to those embodiments. For example, the solid oxide cell of the invention may be used in the form of stacked cells which each are, for example, the solid oxide cell 1 shown in FIG. 1.

The structure of the solid oxide cell 1 of the invention is not particularly limited. For example, it may have a flat solid oxide cell constitution including a stack of structures which each is composed of a flat electrolyte layer, an anode formed on one side of the layer, and a cathode formed on the other side and which have been superposed through a separator. Alternatively, the solid oxide cell 1 may have a cylindrical solid oxide cell constitution having a structure obtained by successively forming a cathode, an electrolyte layer, and an anode in this order on the periphery of a cylindrical supporting tube.

In the invention, at least reaction schemes (1) and (2) are utilized at the anode during power generation to generate electricity.

$$CO_2 + C \rightarrow 2CO \qquad (1)$$

$$CO + O^{2-} \rightarrow CO_2 + 2e^- \qquad (2)$$

By utilizing reaction scheme (1), the solid carbon extensively distributed in spaces in the anode is converted to gaseous CO and consumed as a fuel. Because of this, the influence of the position of solid carbon on power generation can be considerably reduced. Namely, in solid oxide cells, electrode reactions occurring in positions closer to the electrolyte surface generally contribute more to power generation, and solid carbon distributed apart from the electrolyte surface is hence less apt to be consumed. Because of this, it is possible to attain a high efficiency of fuel utilization, i.e., longer-period power generation, as compared with the case where the reaction represented by reaction scheme (1) does not occur.

In addition, the oxidation reaction of CO according to reaction scheme (2) proceeds at a higher reaction rate than the oxidation reaction of solid carbon according to the following reaction scheme (3) or reaction scheme (4). A high power density is hence obtained. Examples of techniques for causing the reaction according to reaction scheme (2) to occur predominantly include: a technique in which the reaction-product gases are prevented from being released to the outside of the anode in an amount of no less than a pressure increase by the reaction-product gases and the carbon monoxide (CO) yielded according to scheme (1) or scheme (3) is thereby caused to reside in the anode for a longer time period; and a technique in which oxygen is inhibited from coming into the anode from outside the system and thereby consuming the carbon monoxide (CO) through oxidation.

$$C + O^{2-} \rightarrow CO + 2e^- \qquad (3)$$

$$C + 2O^{2-} \rightarrow CO_2 + 4e^- \qquad (4)$$

In the invention, the solid oxide cell preferably is one in which 50% by mole or more of the carbon monoxide (CO) consumed according to reaction scheme (2) is yielded according to reaction scheme (1), i.e., a solid oxide cell in which 50% by mole or more of the carbon monoxide to be consumed during power generation is the carbon monoxide yielded by the reaction of the solid carbon with carbon dioxide. That proportion is especially preferably 60% by mole or higher, more preferably 70% by mole or higher.

In the invention, the solid oxide cell preferably is one in which 50% or more of the amount of charge transfer is attributable to the oxidation of the carbon monoxide obtained by the reaction of the solid carbon with carbon dioxide. Specifically, the solid oxide cell preferably is one in which the value of $[(Q2-Q1)/Q2] \times 100$ is 50 or larger, provided that Q1 is the amount of charge transfer when electricity is generated while introducing argon gas of 25° C. and 1 atm to the anode so as to result in a value of F/S of 3.0 (cm/sec), wherein S is the overall area of the anode (cm$^2$) and F is the flow rate of the argon gas as measured at 25° C. and 1 atm (cm$^3$/sec), and Q2 is the amount of charge transfer when electricity is generated without introducing argon gas to the anode, as will be shown in the Examples given later.

Examples of techniques for causing the reaction according to reaction scheme (2) to occur predominantly include: a technique in which the CO yielded according to scheme (1) or scheme (3) is caused to reside in the anode for a longer time period; and a technique in which oxygen inflow is prevented in order to inhibit the CO from being consumed by oxidation with oxygen which has come from outside the system. In conventional solid oxide fuel cells, the reaction represented by reaction scheme (2) hardly occurs because a carrier gas is introduced to the anode.

For causing the reaction represented by reaction scheme (1) to occur at the anode, it is important to cause the $CO_2$ yielded by the electrode reaction (2) and/or (4) to reside in the anode for a longer time period. For attaining this, it is preferred to eliminate the introduction of a carrier gas during power generation. For eliminating the introduction of a carrier gas, it is preferable that the leakage of air, i.e., oxygen, into the anode from outside the system should be minimized by, e.g., improving sealing performance. It is preferred to prevent the partial pressure of oxygen from increasing and thus causing a decrease in voltage.

The gas containing an oxidizing agent, which is fed to the cathode in the power generation step, preferably is air from the standpoint of availability. From the same standpoint, the oxidizing agent preferably is oxygen.

From the standpoint of improving the solid oxide cell 1 in charge transfer amount and power density during power generation, it is preferred that no carrier gas for releasing outward the reaction-product gases yielded at the anode 2 should be supplied to the anode 2.

The solid oxide cell preferably is one which gives an open-circuit voltage of 0.6 V or higher as examined by introduction of argon gas of 25° C. and 1 atm to the anode after activation and before power generation, the argon gas being introduced so as to result in a value of F/S of 6.1 (cm/sec), wherein S is the overall area of the anode ($cm^2$) and F is the flow rate of the argon gas as measured at 25° C. and 1 atm ($cm^3$/sec). F/S herein means the flow rate of argon gas per unit area of the anode.

When the composition, structure, setting, etc. of the solid oxide cell are regulated so that the open-circuit voltage as determined at an argon gas flow rate F ($cm^3$/sec) regulated so as to result in a value of F/S of 6.1 (cm/sec) becomes 0.6 V or higher, then this cell can generate electricity at a high power density over a long time period after short-term activation. The solid oxide cell of the invention can be set so as to satisfy that requirement. By setting the solid oxide cell so as to satisfy that requirement, that excellent performance can be imparted to the cell. In this case, the open-circuit voltage is more preferably 0.7V or higher, especially preferably 0.9V or higher, more preferably 1.0 V or higher.

Argon gas is introduced to the anode at a flow rate of F ($cm^3$/sec). However, this argon gas is introduced as a monitor in order to specify the constitution of the solid oxide cell of the invention, and this does not mean that argon gas is introduced at that flow rate F ($cm^3$/sec) when the solid oxide cell of the invention is used.

That the open-circuit voltage, as measured when the value of F/S is 6.1 (cm/sec), is regulated to 0.6 V or higher means that the reactions represented by the following reaction schemes (1) and (2) proceed efficiently.

$$CO_2 + C \rightarrow 2CO \quad (1)$$

$$CO + O^{2-} \rightarrow CO_2 + 2e^- \quad (2)$$

It is preferred that the composition, structure, setting, etc. of the solid oxide cell should be regulated so that the open-circuit voltage as determined at an argon gas flow rate F ($cm^3$/sec) regulated so as to result in a value of F/S of 6.1 (cm/sec) becomes 0.6 V or higher. Specifically, this is accomplished by reducing the loss of carbon monoxide (CO) in the reaction scheme (1) and/or reaction scheme (2), for example, by minimizing the leakage of air, i.e., oxygen, into the anode from outside the system by, e.g., improving sealing performance as described above or by inhibiting oxygen inflow into the anode from the surrounding atmosphere by, e.g., reducing the diameter of that opening of the anode which is open to the surrounding atmosphere. In this case, the open-circuit voltage is more preferably 0.7 V or higher, especially preferably 0.9 V or higher, more preferably 1.0 V or higher.

Furthermore, the solid oxide cell which has been regulated so as to have an open-circuit voltage of 0.7 V or higher when examined by introduction of argon gas of 25° C. and 1 atm to the anode after activation and before power generation so as to result in a value of F/S of 0.30 (cm/sec) is preferred for the same reason as described above. For accomplishing this, the same techniques as described above may be used. In this case, the open-circuit voltage is more preferably 0.8 V or higher, especially preferably 1.0 V or higher, even more preferably 1.2 V or higher.

Moreover, the solid oxide cell which has been regulated so as to have an open-circuit voltage of 0.9 V or higher when examined by introduction of dry hydrogen gas of 25° C. and 1 atm to the anode after activation and before power generation so as to result in a value of F/S of 6.1 (cm/sec) is preferred for the same reason as described above. For accomplishing this, the same techniques as described above may be used. In this case, the open-circuit voltage is more preferably 1.2 V or higher, especially preferably 1.25 V or higher, even more preferably 1.3 V or higher.

The dry hydrogen gas in this case is introduced as a monitor in order to specify the constitution of the solid oxide cell of the invention, and this does not relate to methods of using the solid oxide cell of the invention. That the cell, when examined after activation and the subsequent introduction of hydrogen gas to the anode before power generation, has an open-circuit voltage not lower than a given value means that the anode reactions represented by reaction schemes (1) and (2) proceed efficiently. The solid oxide cell having such constitution can generate electricity at a high power density over a long time period after short-term activation.

The gas flow rate F ($cm^3$/sec) in each measurement of open-circuit voltage is not particularly limited, and is determined so as to result in a given value of F/S according to the overall area of the anode S ($cm^2$).

The solid oxide cell of the invention can be constituted so as to have a value of Q/T of 1 (mAh/($cm^2$·min)) or larger, provided that T is the duration of activation (min) and Q is the amount of charge transfer per unit area of the anode (mAh/$cm^2$). The solid oxide cell in which the composition, structure, setting, etc. have been regulated so as to result in a value of Q/T of 1 (mAh/($cm^2$·min)) or larger is preferred. Specifically, this is accomplished by reducing the loss of carbon monoxide (CO) in the reaction scheme (1) and/or reaction scheme (2), for example, by minimizing the leakage of air, i.e., oxygen, into the anode from outside the system by, e.g., improving sealing performance as described above or by inhibiting oxygen inflow into the anode from the surrounding atmosphere by reducing the diameter of that opening of the anode which is open to the surrounding atmosphere. The value of Q/T is especially preferably 10 (mAh/($cm^2$·min)) or larger, more preferably 20 (mAh/($cm^2$·min)) or larger.

The term "duration of activation T (min)" means the time period required for solid carbon deposition on the anode material to be finished. The term "amount of charge transfer per unit area of the anode Q (mAh/($cm^2$·min))" means the amount of charges per unit anode area which can be taken out during power generation. Although reducing the value of T inevitably results in a smaller value of Q, the solid oxide cell in which the ratio between these (Q/T) has been regulated to that value or higher is preferred. It should, however, be noted that there is an upper limit on the duration required for activation T (min) and there is a point at which further activation does not result in any increase in Q (hereinafter referred to as "upper limit of T"). Because of this, that ratio (Q/T) holds only when the value of T is not larger than the upper limit of T. The term "duration of activation T (min)" is the time period required for solid carbon deposition on the anode material to be finished. The term "upper limit of T" means the time period required for the anode material to come to have no space available for solid carbon deposition thereon. The term "(especially) preferred value of Q/T" or the like means that the solid oxide cell having that value of Q/T when T is at any point below the upper limit of T is (especially) preferred. Hereinafter, "amount of charge transfer per unit area of the anode" is often referred to simply as "amount of charge transfer".

In the solid oxide cell having a value of Q/T of 1 (mAh/(cm²·min)) or larger, there are no particular limitations on temperature during power generation. However, even when the temperature is set at 750° C. or lower, sufficient performance is obtained. It is therefore preferred to conduct power generation at a temperature in that range.

The solid oxide cell of the invention can be constituted so as to have a vale of P/T of 5 (mW/cm²·min)) or larger, provided that T is the duration of activation (min) and P is power density (mW/cm²). The solid oxide cell in which the composition, structure, setting, etc. have been regulated so as to result in a value of P/T of 5 (mW/cm² min) or larger is preferred. The value of P/T is especially preferably 7 (mW/(cm²·min)) or larger, more preferably 10 (mW/(cm²·min)) or larger.

Specifically, this is accomplished by reducing the loss of carbon monoxide (CO) in the reaction scheme (1) and/or reaction scheme (2), for example, by minimizing the leakage of air, i.e., oxygen, into the anode from outside the system by, e.g., improving sealing performance as described above or by inhibiting oxygen inflow into the anode from the surrounding atmosphere by reducing the diameter of that opening of the anode which is open to the surrounding atmosphere.

In the solid oxide cell having a value of P/T of 5 (mW/(cm²·min)) or larger, there are no particular limitations on temperature during power generation. However, even when the temperature is set at 750° C. or lower, sufficient performance is obtained. It is therefore preferred to conduct power generation at a temperature in that range.

In the solid oxide cell of the invention, the temperature for the activation step is preferably 400-1,000° C., especially preferably 600-900° C. When the temperature is too low, there are cases where the rate of the pyrolysis reaction is too low and the activation step necessitate a prolonged time period. On the other hand, when the temperature is too high, there are cases where carbon is deposited in a reduced amount due to equilibrium between the ingredient to be pyrolyzed and the carbon deposit. The temperature for the power generation step is preferably 400-1,000° C., more preferably 500-900° C., especially preferably 600-750° C. When the temperature is too low, there are cases where power density decreases because the reaction represented by reaction scheme (1) is less apt to proceed and the cell (the electrodes and electrolyte) has increased resistance. On the other hand, when the temperature is too high, there are cases where deterioration of the cell and peripheral members is accelerated.

The solid oxide cell of the invention can be constituted so as to have a power density of 50 (mW/cm²) or higher in power generation at a temperature of 750° C. or lower. The solid oxide cell in which the composition, structure, setting, etc. have been regulated so as to result in a power density of 50 (mW/cm²) or higher is preferred. In particular, by using GDC as the electrolyte, a power density of 50 (mW/cm²) or higher can be attained even at a power generation temperature of 750° C. or lower. Furthermore, even when power generation is conducted at a temperature of 700° C. or lower, a charge transfer amount of 17 (mAh/cm²) or larger can be attained.

The solid oxide cell of the invention can be constituted so as to have an efficiency of fuel utilization of 60% or higher in power generation at a current density of 9.3 mA/cm². The solid oxide cell in which the composition, structure, setting, etc. have been regulated so as to result in an efficiency of fuel utilization of 60% or higher is preferred. The term "efficiency of fuel utilization" herein means the proportion of the amount of carbon assumed to be consumed according to reaction scheme (4) and calculated from the amount of charge transfer to the amount of solid carbon deposited on the anode material in the activation step.

The solid oxide cell of the invention can be constituted so as to have an efficiency of fuel utilization of 20% or higher in power generation at a current density of 80 mA/cm². The solid oxide cell in which the composition, structure, setting, etc. have been regulated so as to result in an efficiency of fuel utilization of 20% or higher is preferred. The term "efficiency of fuel utilization" herein means the proportion of the amount of carbon assumed to be consumed according to reaction scheme (4) and calculated from the amount of charge transfer to the amount of solid carbon deposited on the anode material in the activation step. The efficiency of fuel utilization in that power generation is especially preferably 30% or higher, more preferably 40% or higher.

Specifically, this is accomplished by reducing the loss of carbon monoxide (CO) in the reaction scheme (1) and/or reaction scheme (2), for example, by minimizing the leakage of air, i.e., oxygen, into the anode from outside the system by, e.g., improving sealing performance as described above or by inhibiting oxygen inflow into the anode from the surrounding atmosphere by reducing the diameter of that opening of the anode which is open to the surrounding atmosphere.

Embodiments of the best mode in the case of utilizing the invention mainly as a fuel cell were explained above. However, the invention is applicable to secondary cells, hydrogen generators, exhaust gas cleaning, etc., i.e., utilizable also as an electrochemical reactor. In such cases also, the invention can be suitably practiced according to the explanations given above.

EXAMPLES

The invention will be explained below in more detail by reference to Examples, but the invention should not be construed as being limited to the following Examples.

Example 1

A disk of 8YSZ ($ZrO_2$ doped with 8% by mole $Y_2O_3$) having a thickness of 0.3 mm was used as an electrolyte. A porous Ni/GDC (Gd-doped ceria) cermet was used as an anode material, and a porous $La_{0.85}Sr_{0.15}MnO_3$ film was used as a cathode material. The anode (fuel electrode) had a thickness of 30 μm, except that the anode (fuel electrode) thickness was 50 μm only in the experiment shown in FIG. 4, in which the amount of carbon dioxide ($CO_2$) evolved was determined. The constitution and production process used were in accordance with the constitution and production process for general solid oxide fuel cells. Namely, powders of the anode material and cathode material were each dispersed in a solvent, and an organic binder and other additives were added thereto to prepare slurries. Subsequently, the slurries were applied to the disk by the doctor blade method and burned to produce a solid oxide fuel cell.

Pure dry propane was fed through the gas feed opening to the solid oxide cell in an open state at a flow rate of 46 STP-mL/min (wherein STP means standard conditions, i.e., conditions of 25° C. and 1 atm) at 900° C. for 5 minutes to deposit solid carbon through pyrolysis reaction.

Thereafter, pure argon (Ar) was supplied to the anode at 202 STP-mL/min for about 1 hour, and residual gases including $CH_4$, $H_2$, and CO were ascertained by gas chromatography to have been sufficiently discharged. Thereafter, the introduction of argon (Ar) was stopped. In initial power generation, the concentration of the residual gases was 0.02% by volume or lower.

In the solid oxide cell, the anode had an overall area S ($cm^2$) of 0.55 $cm^2$. Consequently, the flow rate of argon gas F ($cm^3$/sec) at 25° C. and 1 atm was adjusted to 3.3 ($cm^3$/sec) to regulate the value of F/S to 6.1 (cm/sec). Argon gas of 25° C. and 1 atm was thus introduced to the anode at the flow rate of 3.3 ($cm^3$/sec) after the activation and before power generation to measure the open-circuit voltage in six cycles. As a result, the open-circuit voltages in the cycles were 0.95, 1.01, 1.00, 0.96, 1.01, and 1.02 V in this order.

Furthermore, the flow rate of dry hydrogen gas F ($cm^3$/sec) at 25° C. and 1 atm was adjusted to 3.3 ($cm^3$/sec) to regulate the value of F/S to 6.1 (cm/sec). Dry hydrogen gas of 25° C. and 1 atm was introduced to the anode at the flow rate of 3.3 ($cm^3$/sec) after the activation and before power generation to measure the open-circuit voltage. As a result, the open-circuit voltage was 1.32 V.

During power generation, pure oxygen was fed as an oxidizing agent to the cathode side, and argon (Ar) gas was not introduced to the anode side. The cell was tightly sealed, and a ⅛-inch stainless-steel tube having a length of 3.5 m extending from the anode was connected via a gas chromatograph to a vinyl tube having a length of 5 m (inner diameter, 8 mm). A route for outward gas discharge was thus established to thereby inhibit the reversal diffusion of air from the surrounding atmosphere. Power generation was conducted at 900° C. and a constant current density of 80 mA/$cm^2$. The terminal voltage was monitored, and the power generation was stopped when the terminal voltage reached 0 V.

The deposition of pyrolytic carbon (solid carbon) by the introduction of pure dry propane and a subsequent power generation experiment were performed six times. The resultant voltage changes are shown in FIG. 2. In the first cycle, electricity was stably generated over 83 minutes at an output of 44.2-50.4 mW/$cm^2$. In the second cycle, electricity was generated over 66 minutes at 45.5-51.0 mW/$cm^2$. In the third cycle, electricity was generated over 70 minutes at 44.4-49.1 mW/$cm^2$. In the fourth cycle, electricity was generated over 58 minutes at 44.1-48.6 mW/$cm^2$. In the fifth cycle, electricity was generated over 36 minutes at 44.3-50.0 mW/$cm^2$. In the sixth cycle, electricity was generated over 60 minutes at 44.3-50.0 mW/$cm^2$. The constant-current power generation times in the cycles were 105, 90, 83, 89, 95, and 92 minutes, respectively.

Consequently, the values of Q/T, wherein Q is the amount of charge transfer per unit area of the anode (mAh/$cm^2$) and T is the duration of solid carbon deposition (min), for the cycles were found to be 28, 24, 22, 24, 25, and 24 (mAh/($cm^2$·min)), respectively.

The values of W/T, wherein W is the power density (mW/$cm^2$) and T is the duration of solid carbon deposition (min), for the cycles were 10, 10, 9.8, 9.7, 10, and 10 (mW/($cm^2$·min)), respectively. No deterioration in performance was observed in the six cycles each including solid-carbon deposition (activation) and power generation.

In the voltage change in each of the first to the sixth cycles shown in FIG. 2, a slight increase in voltage was observed immediately after the initiation of power generation. It was hence found that the oxidation of CO according to scheme (2), which has a higher reaction rate than the oxidation of solid carbon according to reaction schemes (3) and (4), contributed to the electrode reactions. Namely, the reactions according to reaction scheme (3) and/or schemes "(4)→(1)" occur immediately after the initiation of power generation, and the oxidation reaction of the CO thus yielded begins successively. This is attributable to that behavior observed.

Subsequently, the seventh deposition of pyrolytic carbon (solid carbon) was conducted to examine a relationship between power density and current density while using sweeping values of current density. The results obtained are shown in FIG. 3. It was found from FIG. 3 that a maximum power density of 52 mW/$cm^2$ had been obtained. The value of W/T was 10 (mW/($cm^2$·min)).

Finally, an experiment for ascertaining the occurrence of the reaction represented by reaction scheme (1) at the anode was conducted. At a constant current density of 80 MA/$cm^2$, the amount of $CO_2$ assumed to be evolved according to reaction scheme (4) was 73 STP-mL/min. Consequently, $CO_2$ was supplied at a rate of 73 STP-mL/min and 900° C. to the anode which had undergone solid carbon deposition, and the gas discharged from this anode was analyzed for composition by gas chromatography. In this operation, power generation was not conducted.

As shown in FIG. 4, the $CO_2$ which had been introduced to the anode was ascertained to have been converted to CO. The CO flow rate decreases with time; this is because the deposited solid carbon is gradually consumed according to scheme (1). The lateral line in FIG. 4 corresponds to the $CO_2$ flow rate. Although the oxidation reaction of solid carbon occurs only in those areas in the three-phase boundary which are located near the electrolyte surface, the solid carbon distributed throughout the whole anode can be consumed as a fuel according to reaction scheme (1). Thus, it has become possible to improve power density and attain long-term power generation after one operation for solid carbon deposition, i.e., one activation step.

The efficiencies of fuel utilization in the cycles in power generation at a current density of 80 mA/$cm^2$ were 48.9, 41.6, 38.6, 41.2, 44.2, and 42.6%, respectively. At least 40% by mass of the activation carbon including not only the solid carbon deposited in inner parts of the porous anode but also the more predominant solid carbon deposited on the outermost surface of the anode had been consumed for power generation. It was hence found that during power generation, the reactions represented by reaction schemes (1) and (2) occurred more dominantly than the reaction represented by reaction scheme (3) and/or (4).

For the purpose of examining the influence of the kind of organic compound introduced in the activation step on power generation output and power generation time, dry methane and dry propane were introduced for activation and power generation was conducted at 900° C. and 9.3 mA/$cm^2$. The changes in power density with time in this power generation are shown in FIG. 5. The cell used employed a 0.3-mm 8YSZ disk as an electrolyte, a porous Ni/GDC cermet as an anode material, and a porous $La_{0.85}Sr_{0.15}MnO_3$ film as a cathode material, as in the Example given above.

When dry hydrogen was introduced at 900° C. and 3.3 $cm^3$/sec, the cell had an open-circuit voltage of 1.36 V. In the step of activation with solid carbon, dry methane or dry propane was introduced to the anode of the same cell at 900° C. The dry methane was introduced at 200 $cm^3$/min for each of 30 minutes and 240 minutes, while the dry propane was introduced at 200 $cm^3$/min for 30 minutes.

It can be seen from FIG. 5 that the introduction of dry propane in the activation step enabled longer-period power generation at a higher power density than the introduction of methane. The values of Q/T, wherein Q is the amount of charge transfer per unit area of the anode (mAh/$cm^2$) and T is the duration of solid carbon deposition (min), for the introduction of dry methane for 30 minutes and for 240 minutes were 0.15 (mW/(cm$^2$·min)) and 0.11 (mW/(cm$^2$·min)), respectively. The value of Q/T for the introduction of dry propane for 30 minutes was 7.8 (mW/(cm$^2$·min)).

Example 2

As an electrolyte, use was made of a GDC ($Ce_{0.9}Gd_{0.1}O_{2-x}$) disk having a thickness of 0.3 mm or an 8YSZ ($ZrO_2$ doped with 8% by mole $Y_2O_3$) disk having a thickness of 0.3 mm. An Ni/GDC cermet was used as an anode material (fuel electrode). The anode (fuel electrode) had a thickness of 40 μm. As a cathode material (air electrode), SSC ($Sm_{0.5}Sr_{0.5}CoO_3$) or LSM ($La_{0.85}Sr_{0.15}MnO_3$) was used when the GDC disk or the 8YSZ disk, respectively, was used as an electrolyte. The constitution and production process used were in accordance with the constitution and production process for general solid oxide fuel cells.

Dry propane was fed to the anode at a flow rate of 50 STP-mL/min (ccm) for 5 minutes while keeping the fuel cell in an open state, and carbon was deposited on the anode by pyrolysis reaction at 700-900° C. This pyrolysis reaction was conducted at the same temperature as power generation. Thereafter, argon only was supplied to the anode, and residual gases including $CH_4$, $H_2$, and CO were ascertained by gas chromatography to have been sufficiently discharged. Thereafter, a power generation experiment was conducted. Power generation was conducted at a constant current density and was stopped when the terminal voltage reached 0 V. The power generation was conducted at temperatures of 700-900° C. Pure oxygen was used as a cathode-side oxidizing agent.

In FIG. 6 are shown the power generation characteristics at 750° C. of the solid oxide cell employing the GDC electrolyte. Five-minute activation with dry propane enabled 27-minute power generation at a current density of 40 mA/cm$^2$ or 13-minute power generation at a current density of 80 mA/cm$^2$. The maximum power density at 80 mA/cm$^2$ was 58.9 mW/cm$^2$. On the other hand, in the cell employing the 8YSZ electrolyte, the maximum power density in power generation at 900° C. and 80 mA/cm$^2$ was almost the same as the value. Namely, when the GDC electrolyte was used, the cell attained the same power density even at 750° C. The oxygen ion conductivity of GDC at 750° C. is equal to the ionic conductivity of 8YSZ at 900° C. However, this fact by itself cannot be used to explain those results. Namely, since electrode overvoltage becomes higher with decreasing temperature, a reduction in anode overvoltage was realized by the use of the GDC electrolyte.

In FIG. 7 is shown relationships between current density (abscissa) and the amount of charge transfer per unit anode area in one power generation operation (ordinate) in the solid oxide cell employing the GDC electrolyte. At each of current densities of 40 mA/cm$^2$ and 80 mA/cm$^2$, the amount of charge transfer was 17-18 mAh/cm$^2$, which was sufficient. There was a tendency that the higher the current density, the smaller the charge transfer amount. The amount of charge transfer even at 700° C. was not significantly different from that at 750° C., and was sufficient.

On the other hand, in the solid oxide cell employing the 8YSZ electrolyte, an excellent charge transfer amount of 120 mAh/cm$^2$ was obtained in power generation at 900° C. and 80 mA/cm$^2$.

Example 3

As electrolytes were used an 8YSZ ($ZrO_2$ doped with 8% by mole $Y_2O_3$) disk, an SCSZ ($ZrO_2$ doped with 10% by mole $Sc_2O_3$ and 1% by mole $CeO_2$) disk, and a GDC ($Ce_{0.1}Ga_{0.9}O_{2-x}$) disk each having a thickness of 0.3 mm. As an anode (fuel electrode) was used an Ni/GDC cermet. The Ni/GDC weight ratio was 50/50 or 40/60. The ratio is 50/50 unless otherwise indicated. The anode (fuel electrode) had a thickness of 30-50 μm. As a cathode (air electrode), a porous $La_{0.85}Sr_{0.1}MnO_3$ film was used when the 8YSZ disk or ScSZ disk was used as an electrolyte or a porous SSC ($Sm_{0.5}Sr_{0.5}CoO_3$) film was used when the GDC disk was used as an electrolyte. The constitution and production process used were in accordance with the constitution and production process for general solid oxide fuel cells.

Pure dry propane was fed to the anode at a flow rate of 50 STP-mL/min (ccm) for 5-30 minutes while keeping the cell in an open-circuit state, and carbon was deposited on the anode by pyrolysis reaction at 700-900° C. Unless otherwise indicated, the pyrolysis temperature is the same as power generation time. Thereafter, argon only was supplied to the anode, and residual gases including $C_3H_8$, $H_2$, and CO were ascertained by gas chromatography to have been sufficiently discharged. Thereafter, the supply of argon was stopped, and a power generation experiment was conducted. Power generation was conducted at a constant current density and was stopped when the terminal voltage reached 0 V. The power generation was conducted at temperatures of 700-900° C. Pure oxygen was used as a cathode-side oxidizing agent.

The amount of carbon deposited was determined by pyrolyzing carbon in the same manner as in power generation, subsequently feeding argon-diluted oxygen to the anode (fuel electrode) to burn the carbon, and determining the amounts of the resultant CO and $CO_2$ contained in the discharge gas by gas chromatography.

<GDC Electrolyte>

In FIG. 8 are shown the power generation characteristics of cells respectively employing the 8YSZ electrolyte and the GDC electrolyte in power generation from solid carbon. These cells had anode (fuel electrode) thicknesses of 30 μm and 35 μm, respectively. For the deposition of pyrolytic carbon, propane was fed at 50 ccm for a period of 5 minutes in the case of the YSZ electrolyte or 30 minutes in the case of the GDC electrolyte. Power generation was conducted at a current density of 80 mA/cm$^2$ in each cell.

In the case of the 8YSZ electrolyte, stable power generation at 900° C. was possible at 44-52 mW/cm$^2$ over about 80 minutes. On the other hand, in the case of the GDC electrolyte, stable power generation at 700° C. was possible at 44-57 mW/cm$^2$ over about 40 minutes. By using the GDC electrolyte, a power density equal to that in 900° C. power generation with the YSZ electrolyte was obtained at 700° C. However, a larger charge transfer amount was obtained in the 900° C. power generation with the YSZ electrolyte. The high power density obtained in the case of using the GDC electrolyte is attributable to a reduced anode overvoltage.

In FIG. 9 are shown the power generation characteristics of cells employing the GDC electrolyte in power generation at 800° C. and 80-200 mA/cm$^2$. The anode (fuel electrode) in each cell had a thickness of 35 μm. The duration of pyrolytic-carbon deposition was 30 minutes in each cell. The power density increased with increasing current density, and a maximum power density of 138 mW/cm$^2$ was achieved at 200 mA/cm$^2$.

In FIG. 10 are shown relationships obtained by plotting terminal voltage and power density each measured immediately after power generation initiation against current density in power generation operations conducted at different current densities. In the figure, the terminal voltage at a current density of 0 mA/cm$^2$ indicates the open-circuit voltage OCV as measured just before initiation of the power generation from solid carbon and was 0.819 V. When the current density was changed in the range of 80-200 mA/cm$^2$, the terminal voltages immediately after initiation were 0.775-0.690 V and decreased little. Use of the solid carbon fuel gave satisfactory characteristics.

<ScSZ Electrolyte>

FIG. 11 shows a comparison between the power generation characteristics of cells employing the ScSZ electrolyte and those of a cell employing the 8YSZ. In each cell, the anode (fuel electrode) had a thickness of 30 μm. Pyrolytic carbon was deposited by feeding propane at 900° C. and 50 ccm for 5 minutes. A power generation experiment was conducted at 900° C. and a current density of 80 mA/cm$^2$. With respect to the amount of charge transfer Q (mAh/cm$^2$) and the value of Q/T, wherein T is the duration of pyrolytic-carbon deposition (duration of activation) (min), the cells employing the ScSZ electrolyte had a value of Q of 234 mAh/cm$^2$ and a value of Q/T of 46.8 mAh/(cm$^2$·min)). The cell employing the YSZ electrolyte had a value of Q of 119 mAh/cm$^2$ and a value of Q/T of 23.8 mAh/(cm$^2$·min)).

<Influence of Anode Film Thickness>

FIG. 12 and FIG. 13 show the influences of anode thickness and anode composition (Ni/GDC weight ratio) on the power generation characteristics of a cell employing the ScSZ electrolyte. Pyrolytic carbon was deposited by feeding propane at 900° C. and 50 ccm for 5 minutes. A power generation experiment was conducted at 900° C. and current densities of 80 mA/cm$^2$ and 160 mA/cm$^2$.

The larger anode film thickness of 50 μm gave a high power density and a long power generation time. Namely, at a current density of 80 mA/cm$^2$, the maximum power density was 72.4 mW/cm$^2$ (P/T=14.5 mW/(cm$^2$·min)) and the amount of charge transfer was 302 mAh/cm$^2$ (Q/T=60.4 mAh/(cm$^2$·min)). At a current density of 160 mA/cm$^2$, the maximum power density was 134 mW/cm$^2$ (P/T=26.8 mW/(cm$^2$·min)) and the amount of charge transfer was 310 mAh/cm$^2$ (Q/T=62.0 mAh/(cm$^2$·min)). With respect to anode composition, Ni/GDC=50/50 was superior to Ni/GDC=40/60 in power density and power generation time.

In FIG. 14 are shown relationships between pyrolytic-carbon deposition temperature and carbon deposit amount in a cell employing the ScSZ electrolyte. Pyrolytic carbon was deposited by feeding propane at a given temperature and 50 ccm for 5 minutes. When the anode film thickness was changed, the amount of carbon deposit increased with increasing film thickness. It is therefore thought that the improvement in charge transfer amount which was attained by increasing the film thickness was mainly attributable to an increase in carbon deposit amount. The amount of carbon deposited by the pyrolysis reaction of propane was maximal at around 700° C.

<Influence of Carbon Deposition Temperature>

In FIG. 15 is shown the influence of pyrolytic-carbon deposition temperature on power generation characteristics in a cell employing ScSZ as the electrolyte. The anode had a film thickness of 50 μm. Pyrolytic carbon was deposited by feeding propane at 800° C. or 900° C. and at 50 ccm for 5 minutes. A power generation experiment was conducted at 900° C. and a current density of 80 mA/cm$^2$.

In the case where the carbon deposition temperature was 900° C., stable power generation was possible at 50-62 mW/cm$^2$ over about 200 minutes, and the amount of charge transfer was 302 mAh/cm$^2$ (Q/T=60.4 mAh/(cm$^2$·min)). In the case where the carbon deposition temperature was 800° C., power generation over a period as long as about 400 minutes was possible at 45-55 mW/cm$^2$, and the amount of charge transfer was 613 mAh/cm$^2$ (Q/T=123 mAh/(cm$^2$·min)). Namely, the latter case attained about two-fold improvements in power generation time and charge transfer amount. Incidentally, the cell was not significantly deteriorated by temperature changes after the deposition of pyrolytic carbon.

In FIG. 16 are shown relationships between the duration of pyrolytic-carbon deposition (duration of activation) and the amount of charge transfer in one power generation operation. The amount of charge transfer increased as the duration of pyrolytic-carbon deposition (duration of activation) increased.

Example 4

Anode (Fuel Electrode) Thickness: 80 μm

As an electrolyte was used an ScSZ ($ZrO_2$ doped with 10% by mole $Sc_2O_3$ and 1% by mole $CeO_2$) disk having a thickness of 0.3 mm. As an anode (fuel electrode) was used an Ni/GDC (GDC: $Ce_{0.67}Gd_{0.33}O_{2-\delta}$) cermet having a thickness of 80 μm. The Ni/GDC weight ratio was 50/50. As a cathode (air electrode) was used a porous composite film composed of $La_{0.85}Sr_{0.15}MnO_{3-\delta}$ (LSM) and GDC and having an LSM/GDC weight ratio of 60/40 and a thickness of 40 μm. The constitution and production process used were in accordance with the constitution and production process for general solid oxide fuel cells.

Pure dry propane was fed to the anode at a flow rate of 50 ccm for 5-20 minutes while keeping the cell in an open-circuit state, and carbon was deposited on the anode by pyrolysis reaction at 800° C. or 900° C. Thereafter, argon only was supplied to the anode, and residual gases including $C_3H_8$, $H_2$, and CO were ascertained by gas chromatography to have been sufficiently discharged. Thereafter, the supply of argon was stopped, and a power generation experiment was conducted.

Power generation was conducted at a constant current density and was stopped when the terminal voltage reached 0 V. The power generation was conducted at the same temperature as the pyrolysis, i.e., 800° C. or 900° C. Pure oxygen was used as an oxidizing agent. One fuel cell was used to examine its power generation characteristics while successively changing conditions including pyrolytic-carbon deposition conditions, power generation temperature, and current density as shown in Table 1. The resultant changes in output with power generation time are shown in FIGS. 17 to 20.

With respect to maximum power density, it exceeded 250 mW/cm$^2$ (P/T=50 mW/(cm$^2$·min)), although in a moment, at 900° C. and current densities of 320 mA/cm$^2$ and 360 mA/cm$^2$ as shown in FIG. 17 (Experimental Nos. 4 and 5 in Table 1). With respect to the amount of charge transfer, it was 323 mAh/cm$^2$ (Q/T=64.5 mAh/(cm$^2$·min)) at 900° C. and a current density of 80 mA/cm$^2$ as shown in FIG. 18 (Experimental No. 7 in Table 1) and was 1,014 mAh/cm$^2$ (Q/T=203 mAh/(cm$^2$·min)) at 800° C. and a current density of 80 mA/cm$^2$ as shown in FIG. 20 (Experimental No. 14 in Table 1). In the case where pyrolytic carbon was deposited for 20 minutes and power generation was conducted at 900° C. and a current density of 280 mA/cm$^2$, electricity could be stably generated over about 120 minutes at an output as high as about 150 mW/cm$^2$ as shown in FIG. 19 (Experimental No. 10 in Table 1). The amount of charge transfer in this experiment was 646 mAh/cm$^2$ (Q/T=32.3 mAh/(cm$^2$·min)).

The current density dependence of maximum power density and voltage in power generation at 900° C. in the power generation experiments described above is shown in FIG. 21.

In order to examine the influence of argon (Ar) gas flow (hereinafter abbreviated to "Ar flow") during power generation, the same fuel cell as that used in the above experiment in this Example was used. Power generation was conducted at 900° C. while causing argon (Ar) gas to flow through the cell at rates of 10 ccm and 100 ccm to examine the dependence of charge transfer amount on argon (Ar) gas flow rate. With respect to conditions for pyrolytic-carbon deposition, pyrolytic carbon was deposited by feeding pure dry propane, in this case also, to the anode at a flow rate of 50 ccm for 5 minutes at 900° C. Power generation was conducted at 900° C. and a constant current of 280 mA/cm$^2$.

As shown in FIG. 22 (Experimental Nos. 3, 11, and 12 in Table 1), the charge transfer amount of 280 mAh/cm$^2$, which was a value with no Ar flow, decreased steeply to 21 mAh/cm$^2$ as a result of Ar flow at 100 ccm. The efficiency of fuel utilization decreased from 45.6%, which was a value with no Ar flow, to 3.3% as a result of Ar flow at 100 ccm. This is because the discharge of the $CO_2$ and CO gases present near the anode was accelerated by the Ar flow and, hence, power generation based on the reactions represented by reaction schemes (1) and (2) became less apt to occur. During Ar flow, the power generation reactions were mainly ones represented by reaction schemes (3) and (4), and only a considerably limited part of the deposited solid carbon could be utilized for power generation.

Subsequently to completion of the power generation with Ar flow, power generation was conducted at the same current density of 280 mA/cm$^2$ while stopping Ar flow (Experimental Nos. 11-2 and 12-2 in Table 1). As a result, charge transfer amounts of 247 mAh/cm$^2$ (after completion of power generation with 100-ccm Ar flow) and 235 mAh/cm$^2$ (after completion of power generation with 10-ccm Ar flow) were obtained. When the amount of charge transfer obtained with Ar flow and that obtained without Ar flow are summed up, this total is close to the amount of charge transfer in the power generation conducted without Ar flow from the beginning. It was found that the solid carbon which remained without being utilized after the power generation with Ar flow could be utilized for power generation according to reaction schemes (1) and (2) by stopping the Ar flow. In this Example 4, the proportion of the contribution of reaction schemes (1) and (2) to the amount of charge transfer in the power generation without Ar flow was estimated at 100×(280-21)/280=93%.

Table 1 summarizes the conditions and results of the experiments on an ScSZ electrolyte cell including carbon deposited by the pyrolysis of dry propane. The experiments were conducted using one cell in the order of Experimental No.

TABLE 1

| Experimental No. | Corresponding figure | Pyrolysis gas | Fuel flow rate in pyrolysis [ccm] | Duration of pyrolysis [min] | Pyrolysis temperature [° C.] | Argon flow rate during power generation [ccm] | Power generation temperature [° C.] | Current density [mA/cm$^2$] |
|---|---|---|---|---|---|---|---|---|
| 1 |  | $C_3H_8$ | 50 | 5 | 900 | 0 | 900 | 200 |
| 2 |  | $C_3H_8$ | 50 | 5 | 900 | 0 | 900 | 240 |
| 3 | FIG. 17 | $C_3H_8$ | 50 | 5 | 900 | 0 | 900 | 280 |
| 4 | FIG. 17 | $C_3H_8$ | 50 | 5 | 900 | 0 | 900 | 320 |
| 5 | FIG. 17 | $C_3H_8$ | 50 | 5 | 900 | 0 | 900 | 360 |
| 6 |  | $C_3H_8$ | 50 | 5 | 900 | 0 | 900 | 160 |
| 7 | FIG. 18 | $C_3H_8$ | 50 | 5 | 900 | 0 | 900 | 80 |
| 8 |  | $C_3H_8$ | 50 | 10 | 900 | 0 | 900 | 280 |
| 9 |  | $C_3H_8$ | 50 | 15 | 900 | 0 | 900 | 280 |
| 10 | FIG. 19 | $C_3H_8$ | 50 | 20 | 900 | 0 | 900 | 280 |
| 11 | FIG. 22 | $C_3H_8$ | 50 | 5 | 900 | 100 | 900 | 280 |
| 11-2 |  |  |  |  |  | 0 | 900 | 280 |
| 12 | FIG. 22 | $C_3H_8$ | 50 | 5 | 900 | 10 | 900 | 280 |
| 12-2 |  |  |  |  |  | 0 | 900 | 280 |
| 13 |  | $C_3H_8$ | 50 | 20 | 900 | 0 | 900 | 280 |
| 14 | FIG. 20 | $C_3H_8$ | 50 | 5 | 800 | 0 | 800 | 80 |
| 15 |  | $C_3H_8$ | 50 | 5 | 800 | 0 | 800 | 160 |
| 16 |  | $C_3H_8$ | 50 | 5 | 900 | 0 | 900 | 280 |

| Experimental No. | Power generation time [min] | Maximum output density [mW/cm$^2$] | Amount of charge transfer [mAh/cm$^2$] | Effective carbon mass [mg] | Carbon deposit amount [mg] | Efficiency of fuel utilization [%] | Remarks |
|---|---|---|---|---|---|---|---|
| 1 | 59.3 | 169 | 198 | 11.9 | 36.86 | 32.28 |  |
| 2 | 76 | 191 | 304 | 18.2 | 36.86 | 49.38 |  |
| 3 | 59.9 | 215 | 280 | 16.8 | 36.86 | 45.58 |  |
| 4 | 48.7 | 251 | 260 | 15.6 | 36.86 | 42.32 |  |
| 5 | 39.9 | 258 | 239 | 14.4 | 36.86 | 39.07 |  |
| 6 | 124 | 138 | 331 | 19.8 | 36.86 | 53.72 |  |
| 7 | 242.3 | 75.8 | 323 | 19.4 | 36.86 | 52.63 |  |
| 8 | 104.2 | 220 | 486 | 29.1 |  |  |  |
| 9 | 116.7 | 223 | 545 | 32.6 |  |  |  |
| 10 | 138.5 | 222 | 646 | 38.7 | 81.12 | 47.71 |  |
| 11 | 4.4 | 209 | 20.6 | 1.23 | 36.86 | 3.34 |  |
| 11-2 | 53 | 160 | 247 | 14.8 | 36.86 | 40.15 |  |
| 12 | 7 | 214 | 32.7 | 2 | 36.86 | 5.43 |  |
| 12-2 | 50.3 | 84 | 235 | 14.1 | 36.86 | 38.25 |  |
| 13 | 134.5 | 207 | 628 | 37.6 | 81.12 | 46.35 | repetitions of 20-minute power generation and 10-minute suspension |
| 14 | 760.6 | 56.8 | 1014 | 60.8 | 95.07 | 63.95 |  |
| 15 | 110.3 | 102 | 293 | 17.6 | 95.07 | 18.51 |  |
| 16 | 62.8 | 193 | 293 | 17.6 | 36.86 | 47.75 |  |

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 23, 2006 (Application No. 2006-081679), Japanese patent application filed on Aug. 11, 2006 (Application No. 2006-220265), Japanese patent application filed on Dec. 4, 2006 (Application No. 2006-327130), and Japanese patent application filed on Jan. 19, 2007 (Application No. 2007-010359), the contents thereof being herein incorporated by reference.

INDUSTRIAL APPLICABILITY

The solid oxide cell of the invention can be extensively used as a power supply for portable appliances (small electronic appliances), backup power supply therefor, auxiliary power supply for hybrid vehicles, etc.

The invention claimed is:

1. A method of power generation, in a solid oxide cell comprising:
activating an anode of the solid oxide cell by depositing solid carbon on the anode;
supplying an oxidizing gas to a cathode of the solid oxide cell;
reacting carbon dioxide with the solid carbon deposited on the anode to form carbon monoxide, thus depleting the solid carbon;
oxidizing carbon monoxide at the anode to generate an electrical current by charge transfer to the cathode; and upon depletion of the solid carbon deposited on the anode;
reactivating the anode by depositing solid carbon on the anode;
wherein
a value of Q/T is 1 (mAh/($cm^2$·min)) or larger, in which T is the duration of activation (min) and Q is an amount of charge transfer per unit area of the anode (mAh/$cm^2$),
the solid oxide cell comprises:
an anode comprising a composite metal oxide or a cermet;
a cathode comprising a cathode material; and
an electrolyte disposed between the anode and the cathode, comprising an ionically conductive solid oxide.

2. The method of power generation according to claim 1, wherein at least 50 mole % of the carbon monoxide consumed at the anode during power generation is the carbon monoxide that is generated by the reaction of the solid carbon with carbon dioxide.

3. The method of power generation according to claim 1, wherein at least 50% of the amount of the charge transfer which occurs in the cell is attributable to the oxidation of the carbon monoxide generated by the reaction of the solid carbon with carbon dioxide.

4. The method of power generation according to claim 1, wherein
a value of $[(Q2-Q1)/Q2] \times 100$ is 50 or larger,
wherein
Q1 is an amount of charge transfer which occurs in the cell when electricity is generated while introducing argon gas at a temperature of 25° C. and 1 atm into the anode which results in a value of F/S of 3.0 (cm/sec), wherein S is the overall area of the anode ($cm^2$) and F is the flow rate of argon gas as measured at a temperature of 25° C. and 1 atm ($cm^3$/sec), and Q2 is an amount of charge transfer which occurs when electricity is generated without introducing argon gas into the anode.

5. The method of power generation according to claim 1, wherein during power generation the reaction-product gases are released to the outside of the anode only in an amount no greater than a pressure increase which occurs by the reaction-product gases.

6. The method of power generation according to claim 1, wherein substantially no carrier gas is introduced into the anode during power generation.

7. The method of power generation according to claim 1, wherein oxygen is inhibited from intrusion from outside the system into the anode during power generation.

8. The method of power generation according to claim 1, wherein the deposition of the solid carbon comprises:
introducing an organic compound comprising at least carbon and hydrogen to the anode; and
causing the organic compound to undergo a pyrolysis reaction at a temperature of 200-1,200° C.

9. The method of power generation according to claim 8, wherein the organic compound comprising carbon and hydrogen comprises propane or butane as a main component.

10. The method of power generation according to claim 1, which gives an open-circuit voltage of 0.6 V or higher as determined under the condition of the introduction of argon gas at a temperature of 25° C. and 1 atm into the anode after activation and before power generation, the argon gas being introduced thereby resulting in a value of F/S of 6.1 (cm/sec), wherein S is the overall area of the anode ($cm^2$) and F is the flow rate of the argon gas as measured at 25° C. and 1 atm ($cm^3$/sec).

11. The method of power generation according to claim 1, which gives an open-circuit voltage of 0.7 V or higher as determined under the condition of the introduction of argon gas at a temperature of 25° C. and 1 atm into the anode after activation and before power generation, the argon gas being introduced thereby resulting in a value of F/S of 0.30 (cm/sec), wherein S is the overall area of the anode ($cm^2$) and F is the flow rate of the argon gas as measured at a temperature of 25° C. and 1 atm ($cm^3$/sec).

12. The method of power generation according to claim 1, which gives an open-circuit voltage of 0.9 V or higher as determined under the condition of the introduction of dry hydrogen gas at a temperature of 25° C. and 1 atm into the anode after activation and before power generation, the dry hydrogen gas being introduced thereby resulting in a value of F/S of 6.1 (cm/sec), wherein S is the overall area of the anode ($cm^2$) and F is the flow rate of the dry hydrogen gas as measured at a temperature of 25° C. and 1 atm ($cm^3$/sec).

13. The method of power generation according to claim 1, wherein a value of P/T is 5 (mW/($cm^2$·min)) or larger, wherein T is the duration of activation (min) and P is power density (mW/$cm^2$).

14. The method of power generation according to claim 1, wherein a temperature during power generation is 750° C. or lower.

15. The method of power generation according to claim 1, wherein a temperature during power generation is 750° C. or lower and a power density is 50 (mW/$cm^2$) or higher.

16. The method of power generation according to claim 1, wherein an efficiency of fuel utilization in power generation at a current density of 9.3 mA/$cm^2$ is 60% or higher.

17. The method of power generation according to claim 1, wherein an efficiency of fuel utilization in power generation at a current density of 80 mA/$cm^2$ is 20% or higher.

18. The method of power generation according to, claim 1, wherein the anode material is a cermet which comprises a composite metal oxide and a metal.

19. The method of power generation according to claim 18, wherein the cermet is Ni/(ZrO$_2$ doped with Y$_2$O$_3$)(YSZ), Ni/(Ce/Gd/O)(GDC), Ni/(ZrO$_2$ doped with Sc$_2$O$_3$)(ScSZ), or Ni/((Sm/Sr/CoO$_3$)SDC).

20. The method of power generation according to claim 1, wherein the electrolyte is GDC.

* * * * *